(12) United States Patent
Gardner et al.

(10) Patent No.: US 12,013,270 B2
(45) Date of Patent: Jun. 18, 2024

(54) FLOW SENSOR

(71) Applicant: Flusso Limited, Cambridgeshire (GB)

(72) Inventors: Ethan Gardner, Warwickshire (GB); Andrea De Luca, Cambridgeshire (GB); Florin Udrea, Cambridgeshire (GB)

(73) Assignee: Flusso Limited, Cambridgeshire (GB)

( * ) Notice: Subject to any disclaimer, the term of this patent is extended or adjusted under 35 U.S.C. 154(b) by 173 days.

(21) Appl. No.: 17/185,584

(22) Filed: Feb. 25, 2021

(65) Prior Publication Data

US 2022/0268611 A1 Aug. 25, 2022

(51) Int. Cl.
| | |
|---|---|
| *G01F 1/692* | (2006.01) |
| *G01F 1/684* | (2006.01) |
| *G01L 9/00* | (2006.01) |
| *G01L 19/00* | (2006.01) |

(52) U.S. Cl.
CPC ............ *G01F 1/692* (2013.01); *G01F 1/6845* (2013.01); *G01L 9/0073* (2013.01); *G01L 19/0092* (2013.01)

(58) Field of Classification Search
CPC ..... G01F 1/692; G01F 1/6845; G01L 9/0073; G01L 19/0092
See application file for complete search history.

(56) References Cited

U.S. PATENT DOCUMENTS

| | | | |
|---|---|---|---|
| 2,314,877 A | 3/1943 | Hall | |
| 3,438,253 A | 4/1969 | Kuether | |
| 5,146,787 A | 9/1992 | Thomas | |
| 5,209,121 A | 5/1993 | Hafner | |
| 5,883,310 A | 3/1999 | Ho | |
| 6,460,411 B1 | 10/2002 | Kersjes | |
| 6,523,403 B1 | 2/2003 | Fuertsch | |
| 6,816,301 B1 | 11/2004 | Schiller | |
| 11,035,709 B2 * | 6/2021 | De Luca | ............... G01F 15/024 |

(Continued)

FOREIGN PATENT DOCUMENTS

| | | |
|---|---|---|
| CN | 104764558 A | 7/2015 |
| EP | 1092962 A2 | 4/2001 |
| WO | 2011026427 A1 | 3/2011 |

OTHER PUBLICATIONS

N. T. Nguyen, "Micromachined flow sensors—a review", Flow measurement and Instrumentation, vol. 8, No. 1, (1997) pp. 7-16.

(Continued)

*Primary Examiner* — Ryan D Walsh
(74) *Attorney, Agent, or Firm* — FisherBroyles, LLP

(57) ABSTRACT

We disclose herein a sensing device comprising a semiconductor substrate having a first etched portion, a dielectric layer located on or over the semiconductor substrate, wherein the dielectric layer comprises a first dielectric membrane located adjacent to the first etched portion of the semiconductor substrate, a pressure sensing element and/or a flow sensing element within the first dielectric membrane, and a first structure configured to reinforce the dielectric membrane. A first portion of the first structure is located within the first dielectric membrane, the first structure has a higher stiffness than the first dielectric membrane, and the first portion of the first structure is located between a perimeter of the dielectric membrane and the pressure sensing element or flow sensing element.

24 Claims, 13 Drawing Sheets

(56) References Cited

U.S. PATENT DOCUMENTS

| | | | |
|---|---|---|---|
| 11,067,422 B2* | 7/2021 | Udrea | H01L 35/34 |
| 11,073,415 B2* | 7/2021 | Udrea | G01F 1/7084 |
| 11,280,649 B2* | 3/2022 | De Luca | G01F 1/6845 |
| 2004/0168519 A1 | 9/2004 | Kalvensten | |
| 2007/0277616 A1 | 12/2007 | Nikkel | |
| 2010/0020991 A1 | 1/2010 | Chen | |
| 2014/0069185 A1 | 3/2014 | Tu | |
| 2015/0276533 A1* | 10/2015 | Belov | G01R 33/07 |
| | | | 324/252 |
| 2016/0216144 A1 | 7/2016 | Figi | |
| 2017/0022047 A1 | 1/2017 | Purkl | |
| 2017/0074815 A1* | 3/2017 | Udrea | H05B 3/26 |
| 2017/0097252 A1 | 4/2017 | Huang | |
| 2017/0343500 A1 | 11/2017 | Udrea | |
| 2021/0116282 A1* | 4/2021 | De Luca | G01F 1/6965 |
| 2022/0404300 A1* | 12/2022 | Ali | G01N 33/0027 |

OTHER PUBLICATIONS

J. T. Kuo et al, "Micromachined thermal flow sensors—A review", Micromachines, vol. 3, No. 3, (2012) pp. 550-573.

Eaton, William P., et al., "Micromachined pressure sensors: review and recent developments" Smart Materials and Structures, vol. 6 (1997) pp. 530-539.

Bhat, K. N, "Silicon micromachined pressure sensors" Journal of the Indian Institute of Science vol. 87.1 (2012) pp. 115-131.

* cited by examiner

FLOW SENSOR

TECHNICAL FIELD

The present disclosure relates to a micromachined sensing device and flow sensor assembly including the sensing device, particularly but not exclusively to a sensing device having at least one pressure sensing element and/or flow sensing element, and at least one structure configured to reinforce the dielectric membrane within a dielectric membrane.

BACKGROUND

Micromachining techniques are widely used for the fabrication of micro pressure sensors and micro flow sensors, which show many advantages when compared with their more traditional counterparts, namely lower cost, lower power consumption and higher sensitivity and accuracy. For these reasons, the market demand for such micro sensors is increasing and is presently used across numerous applications.

There have been some reviews discussing developments in micromachined pressure sensors (Eaton, William P., and James H. Smith, "Micromachined pressure sensors: review and recent developments" in *Smart Materials and Structures* 6.5 (1997): 530 and Bhat, K. N, "Silicon micromachined pressure sensors" in the *Journal of the Indian Institute of Science* 87.1 (2012): 115). A particular technique for measuring pressure involves embedding a strain-sensitive element, such as a piezo-resistor, into a membrane.

Micro-machined pressure sensors have long been fabricated and investigated in correlation to the increasing market demand. Notable early prior art includes methods of making the fabrication simpler U.S. Pat. Nos. 5,146,787, 5,209,121, 6,816,301. Since these early works, there have been many patents that use structures for enhancing the performance and reliability of pressure transduction. US 2004/0168519 uses a transducing beam structure inside a vacuum cavity for enhancing the mechanical leverage for better sensitivity. In patent US 2007/0277616, A MEMS pressure sensor includes a base structure that defines an opening underneath the thin-film diaphragm. US 2010/0020991 uses a first axis-symmetrical pattern in the diaphragm for an electroacoustic pressure transducer. CN 104764558 discloses a pressure sensor where the diaphragm has a portion containing a bossed membrane pattern, namely a simple cross pattern defined in the buried layer. WO 2011/026427 shows a mems stress concentrating structure. Here, the apparatus includes a plate with an inner and outer region that are separated by slits, which forms a stress concentrating bridge to focus the mechanical stress. US 2017/0022047 uses spring structures oriented parallel and perpendicular to the diaphragm in order to dissipate the mechanical stresses inside the diaphragm, enabling larger diaphragms with higher linearity. Finally, US 2017/0343500 discloses a micro-hotplate with a metal ring structure in the dielectric layer relating to gas sensors and optical emitting sources.

There have been some reviews discussing developments in micromachined flow sensors (N. T. Nguyen, 'Micromachined flow sensors—a review', *Flow measurement and Instrumentation*, vol. 8, no. 1, pp. 7-16, 1997 and J. T. Kuo, L. Yu, and E. Meng, 'Micromachined thermal flow sensors—A review', *Micromachines*, vol. 3, no. 3, pp. 550-573, 2012). The latter review has particular focus on flow sensors that use a heated element and measure the heat extracted from this element via flow and its forced convection.

Micro-machined thermal flow sensors have long been fabricated and investigated in correlation to the increasing market demand. Notable early works using thermal methodology for flow measurement include U.S. Pat. Nos. 3,438,253A, 2,314,877A with their transitioning into micromachining technology shown in some early works such as U.S. Pat. Nos. 5,883,310A, 6,523,403B1, EP1092962A2. US 2017/0097252A1 incorporates multiple heating elements using silicon-on-insulator technology. US 2014/0069185A1 creates a vacuum cavity to enhance the thermal isolation of the heated element. U.S. Pat. No. 6,460,411 shows a silicon membrane perforated by slots of thermally insulating material as a solution to mitigate power dissipation, sensitivity and dynamic response issues, at the expenses of a more complex fabrication process, still without completely removing the silicon from the membrane. US 2016/0216144A1 a CMOS flow sensor having a heating element and a number of thermocouples where the heating element and the sensing junction of the thermocouples are thermally isolated by a dielectric membrane.

SUMMARY

The devices of the present disclosure are advantageous over state-of-the-art devices for at least the following reasons:

Uniform stress across the dielectric membrane;
Increased tolerance of the functional membrane size during etching of the substrate,
Enhanced sensor to sensor repeatability;
Improved sensor performance Aspects and preferred features are set out in the accompanying claims.

According to a first aspect of the present disclosure, there is provided a sensing device comprising: a semiconductor substrate having a first etched portion; a dielectric layer located on or over the semiconductor substrate, wherein the dielectric layer comprises a first dielectric membrane located adjacent to the first etched portion of the semiconductor substrate; a pressure sensing element and/or a flow sensing element within the first dielectric membrane; and a first structure configured to reinforce the dielectric membrane, wherein a first portion of the first structure is located within the first dielectric membrane, wherein the first structure has a higher stiffness than the first dielectric membrane, and wherein the first portion of the first structure is located between a perimeter of the dielectric membrane and the pressure sensing element or flow sensing element.

The structure configured to reinforce the dielectric membrane may also be referred to as a stress engineering structure or a membrane reinforcement structure. The sensing device may also be referred to as a sensor die or a sensor chip.

The stiffness of the structure configured to reinforce the dielectric membrane is higher than the stiffness of the first dielectric membrane, but the rigidity modulus or elastic modulus of the material comprising the structure configured to reinforce the dielectric membrane may also be higher than the material comprising the dielectric membrane.

A perimeter of the dielectric membrane may refer to a perimeter edge of the dielectric membrane, in other words, the area where the dielectric membrane meets or joins the semiconductor substrate. The area of the dielectric layer above the semiconductor substrate may refer to the area of the dielectric layers outside the dielectric membrane.

Generally speaking, a dielectric membrane may be located immediately adjacent to the etched portion of the substrate. The dielectric membrane corresponds to the area of the dielectric layer above the etched cavity portion of the substrate. Each dielectric membrane may be over a single etched portion of the semiconductor substrate.

The sensing device may be configured to operate as a flow sensing device or as a pressure sensing device.

The sensing device may be a pressure and/or flow sensor chip, comprising of at least one semiconductor substrate and a dielectric membrane on the front side of the semiconductor substrate, which is also the front side of the chip. Within the dielectric membrane, there may be embedded at least one pressure sensing element and/or at least one flow sensing element. A structure configured to reinforce the dielectric membrane is embedded within the dielectric membrane, in the proximity of the edge or the perimeter of the dielectric membrane. An inside or interior edge of the structure configured to reinforce the dielectric membrane is located within the dielectric membrane.

The structure configured to reinforce the dielectric membrane homogenises the residual stress distribution across the dielectric membrane, and controls this stress to be more repeatable across different fabrication lots.

The layer or layers within the dielectric used to form the stress-engineering structure can be manufactured with a better tolerance than the etching process used to form the dielectric membrane. Therefore, the structure configured to reinforce the dielectric membrane can be used to increase reproducibility by taking advantage of the higher fabrication tolerances of the micromachined layers, which can be formed by top-masking and processing steps as opposed to the etched portion, which can be formed by back-masking and back etching. The use of the layers of the structure configured to reinforce the dielectric membrane, that have better mechanical properties (e.g. Higher bending stiffness and Young's Modulus), can form a new stress edge for the membrane, hence negating the tolerance issues caused by under and/or over etching. The size of the membrane and membrane deflection strongly affects the performance of pressure and flow sensors, due to different membrane size resulting in a different residual stresses and varying deflection under the same conditions, therefore increasing reproducibility of the membrane size and membrane deflection increases reproducibility of sensing devices having similar performance characteristics.

The stress-engineering structure can protect the dielectric membrane from cracking, especially near the membrane edge where there are areas of high stress and manufacturing imperfections that can cause stress concentration factors.

The structure configured to reinforce the dielectric membrane has the advantages of both a high structural rigidity and excellent fabrication tolerances of the microfabricated layers of the structure configured to reinforce the dielectric membrane. These two factors result in a newly, more accurately defined membrane deflection perimeter, resulting in more uniform stress across the membrane as well as enhanced sensor-to-sensor repeatability by negating the problem of over- and under-etching.

The semiconductor substrate may be silicon, or silicon on insulator (SOI). However, any other substrate combining silicon with another semiconducting material compatible with state-of-the-art CMOS fabrication processes may be used. Employment of CMOS fabrication processes ensures sensor manufacturability in high-volume, low-cost, high reproducibility and the wide availability of process compatible foundries. CMOS processes also enable on-chip circuitry for sensor performance enhancement and system integration facilitation.

The dielectric membrane may comprise silicon dioxide and/or silicon nitride. The membrane may also comprise one or more layers of spin-on-glass, and a passivation layer over the one or more dielectric layers.

The sensing device may comprise of a silicon substrate and a dielectric layer comprising of silicon oxide.

The shape of the structural ring may be any shape that provides beneficial mechanical properties (e.g. circular, square, square with rounded edged, rectangular with rounded edges etc.) and does not have to be the same shape as the membrane. A circular shape structural membrane is more robust. A square shape, an uneven shape, or a shape that contains edged portions provides greater stress concentration in the location of the pressure sensing elements. The structure configured to reinforce the dielectric membrane may or may not be the same shape as the dielectric membrane.

The structure configured to reinforce the dielectric membrane defines the region of the dielectric membrane that undergoes deformation due to pressure or flow. Therefore, the edge of the structure defines a new functional perimeter for the membrane and controls the distribution of stress across the membrane, making the device behaviour more reproducible and less susceptible to over and under etching.

The membrane may be defined through back-etching using dry or wet etching techniques. When there is a pressure difference between two sides (a first side of an upper surface, and a second side on a lower surface of the dielectric membrane) of the dielectric membrane, deflection is caused and may be measured by the pressure sensing elements.

The structure configured to reinforce the dielectric membrane may be made of any material that is available from a state-of-the-art CMOS fabrication process (e.g. tungsten, aluminium, platinum, single crystal silicon, polysilicon, etc.). The structure configured to reinforce the dielectric membrane may be made within one of the layers used for the pressure sensing elements or flow sensing element, or maybe made in a separate layer or layers.

The structure configured to reinforce the dielectric membrane may be embedded within, above or below the dielectric membrane to engineer the thermo-mechanical properties (e.g. stiffness, temperature profile distribution etc.) of the dielectric membrane. The structure configured to reinforce the dielectric membrane may be fully contained within the dielectric membrane, or bridging between an area inside and outside the membrane. For example, the structure configured to reinforce the dielectric membrane may start inside the dielectric membrane to create the new perimeter and extend over the semiconductor substrate.

In embodiments having at least one pressure sensing element, the structure configured to reinforce the dielectric membrane may be aligned with the pressure sensing elements at points along the perimeter of membrane, so that the structure configured to reinforce the dielectric membrane is located between the pressure sensing element and the closest point on the perimeter of the dielectric membrane to the respective pressure sensing element.

The structure configured to reinforce the dielectric membrane may be located substantially closer to the perimeter or edge of the first dielectric membrane than to the centre of the dielectric membrane. The first stress-engineering structure may be located such that a distance from an edge of the first structure configured to reinforce the dielectric membrane to a centre of the first dielectric membrane is at least 80% of a distance between the perimeter of the first dielectric membrane and the centre of the first dielectric membrane.

An inside edge of the structure configured to reinforce the dielectric membrane is located inside the dielectric membrane or at an edge of the dielectric membrane. The inside edge of the structure configured to reinforce the dielectric membrane may define a new functional perimeter of the dielectric membrane by defining the deformation of the dielectric membrane.

An outside edge of the structure configured to reinforce the dielectric membrane is located closer towards the edge of the dielectric membrane from the inside edge, and may be beyond the edge of the dielectric membrane and over the semiconductor substrate. The outside edge of the structure configured to reinforce the dielectric membrane may be fully contained within the dielectric membrane, may end at the dielectric membrane edge and may also extend beyond the membrane edge and overlap the semiconductor substrate.

Preferably, an outside or outer edge of the structure configured to reinforce the dielectric membrane is placed such that a distance from the outer edge of the structure configured to reinforce the dielectric membrane to a centre of the dielectric membrane is at least 80% of a distance between the perimeter of the dielectric membrane and the centre of the dielectric membrane.

At least one edge of the first structure configured to reinforce the dielectric membrane may be located within the first dielectric membrane and above the first etched portion of the semiconductor substrate.

The first structure configured to reinforce the dielectric membrane may be located completely within the first dielectric membrane.

The first structure configured to reinforce the dielectric membrane may be located such that a second portion of the first structure configured to reinforce the dielectric membrane is located within a region of the dielectric layer outside the first dielectric membrane.

In other words, the first structure configured to reinforce the dielectric membrane may be coupled with or overlap both first and second portions of the dielectric layer, wherein the first portion of the dielectric layer comprises the first dielectric membrane and is directly adjacent to the first etched portion of the substrate, and the second portion of the dielectric layer is directly adjacent to a substrate portion of the semiconductor substrate. The first structure configured to reinforce the dielectric membrane may be located along a perimeter of the first dielectric membrane. The first structure configured to reinforce the dielectric membrane may be formed such that a portion of a width of the first structure configured to reinforce the dielectric membrane is located over the first etched portion of the semiconductor substrate and a remaining portion of the width of the first structure configured to reinforce the dielectric membrane is located over a substrate portion of the semiconductor substrate.

The first structure configured to reinforce the dielectric membrane may comprise one or more structures extending substantially around a perimeter of the first dielectric membrane. The first structure configured to reinforce the dielectric membrane may be a ring structure in the form of continuous structural ring or discontinuous ring having one or more gaps.

The structure configured to reinforce the dielectric membrane may comprise a single structure extending completely around the perimeter of the dielectric membrane (for example a complete loop, circle, or ring structure. Alternatively, the structure configured to reinforce the dielectric membrane may comprise a one or more structures each extending around a large proportion of the distance around the perimeter of the first dielectric membrane (for example one or more half-ring structures or a ring structure having one or more gaps. Alternatively, the structure configured to reinforce the dielectric membrane may comprise a plurality of separate structures located around the perimeter.

The structure configured to reinforce the dielectric membrane may be a ring structure placed around or within the perimeter of the dielectric membrane. The ring structure may be continuous, or may have one or more gaps. Gaps may be used for metal tracks to extend from inside the membrane to outside of the dielectric membrane. Preferably, a ring area of the ring structure may be larger than the total area of the gaps within the ring structure. The presence of the ring or section of open rings helps to engineer the stress locally.

The stress-engineering structure may comprise a series of separate elements (such as metal depositions) around the membrane edge with gaps in between the metal depositions, where the metal depositions are referred to as anchors, and where the size of the anchors and the gaps may be altered to best suit the mechanical properties of the membrane.

The first structure configured to reinforce the dielectric membrane may be configured to operate as a resistor. The stress-engineering structure may comprise a discontinuous ring structure, and at its point of discontinuity, may be connected out to bonding pads to create a resistor. The resistance of the ring structure may be measured and used to determine whether there has been any dielectric membrane damage. The dielectric membrane may be cracked during production or use of the device. When a crack is present in the membrane (which often stem from the membrane edge), these cracks will run across the resistor and provide a resistance change that can be measured, and thus used to detect faulty membranes.

The first structure configured to reinforce the dielectric membrane may comprise one or more layers comprising a CMOS material such as aluminium, polysilicon, tungsten, titanium, single crystal silicon or polysilicon.

Multiple metal layers may be used for the fabrication of the structure configured to reinforce the dielectric membrane. Using multiple layers increases the structural rigidity of the structure configured to reinforce the dielectric membrane. As many metals layers as feasible by the fabrication process may be incorporated in the membrane, in order to increase the structural rigidity of the structure configured to reinforce the dielectric membrane.

Multiple layers may be used to fabricate the structure configured to reinforce the dielectric membrane, where the different layers are different materials to each other. In this case, polysilicon and single crystal silicon may be used in conjunction with metal. The number, shape, size, material combination and permutation of the layers of the structure configured to reinforce the dielectric membrane may be chosen to best alter the mechanical properties of the structure configured to reinforce the dielectric membrane.

The layers within the structure configured to reinforce the dielectric membrane may either have the exact same shape and location, or may have different shape and locations for each layer within the structure configured to reinforce the dielectric membrane. The edges of each layer of the multiple layers may be staggered to improve the topology of the layers. For example, if the layers are manufactured in the same location on top of each other and separated by the dielectric layer, if there is no planarization, then at the edge of the structure, there will be a large drop (or height difference) at the top of the membrane. For example, if each of three layers is 0.5 um thick, the total difference at the membrane top at the structure edge will be 1.5 um. This can cause issues in fabrication and membrane stress. If instead the structure is made such that an edge of a first layer of the structure is spaced from an edge of a second layer of the structure, which is spaced from an edge of a third layer of the structure (for example, if the edge of the first layer is 2 um away from the edge of the second layer, and 4 um away from the edge of the third layer, then there will be 3 drops of 0.5 um instead of a large 1.5 um drop), then the top surface of the dielectric membrane will be smoother.

The pressure sensing element and/or the flow sensing element may be made from a CMOS material such as aluminium, polysilicon, tungsten, titanium, single crystal silicon or polysilicon.

The pressure sensing element formed within the dielectric membrane may be a mechanical pressure sensor. The mechanical pressure sensor may comprise at least one piezo-element formed within the dielectric membrane, wherein the piezo-element is configured to operate as a pressure sensing device.

The piezo-element formed within the dielectric membrane can be a piezo-resistor, a piezo-diode, a piezo-transistor or any other device having an electrical output which can be correlated to the mechanical displacement of the membrane under an applied pressure. The piezo-element may be positioned in the area of the membrane that undergoes maximum stress, to increase the sensitivity of the piezo-element to changes in pressure. The orientation of the piezo-element with respect to the semiconductor substrate crystal orientation may be chosen to ensure maximum sensitivity to stress.

The materials of the piezo-element may be any available in a state-of-the-art CMOS process, for example tungsten, titanium, aluminium, single crystal silicon, or polysilicon etc. Generally, the type, position, orientation, material, number, shape and size of the piezo-element can be chosen to achieve specific performance.

At least one pressure sensing element may be also embedded within the dielectric layer over the semiconductor substrate, as well as the at least one pressure sensing element within the dielectric membrane.

The structure configured to reinforce the dielectric membrane has the advantage of a more accurate and more repeatable membrane perimeter, and results in the residual stresses across the dielectric membrane being both more uniform and more consistent across devices. This will increase the robustness of a sensing device having a flow sensing element as well as minimising the device-to-device variation, resulting in a more accurate and repeatable sensing device in high-volume production.

The flow sensor element formed within the membrane region may be a thermal flow sensor. The flow sensing element may comprise of a heating element and a temperature sensing element. The heating element may be made from a CMOS material such as aluminium, polysilicon, tungsten, titanium, single crystal silicon or polysilicon.

Preferably, the flow sensing element may be made of tungsten. Tungsten is highly electromigration resistant and permits a high current density, thus can reliably reach high temperatures.

The heating element may be configured to function as a temperature sensing element. The heating element can be provided with both amperometric and voltametric connections allowing a 4-wire type measurement of its resistance.

Alternatively, the heating element and temperature sensing element may be separate. The temperature sensing element may be located underneath the heating element.

The temperature sensing element may be spatially separated from the heater, so that they can be used for calorimetric flow sensing. For this, the sensing device may comprise a temperature sensing element on both sides of the heating element that measure the temperature profile across the dielectric membrane. This can be used to measure bi-directional flow.

The temperature sensing element may be a resistive type device, p-n junction type device, a three-terminal device, a thermo-couple device or an array of thermo-couple devices (i.e. thermopile). The temperature sensing element may be made of any material that is available from a state-of-the-art CMOS fabrication process (e.g. tungsten, aluminium, platinum, single crystal silicon, polysilicon, etc.).

The heating element may be operated in pulsed mode, e.g. driven with a sinusoidal wave, square wave, Pulse Width Modulated (PWM) wave, etc. or continuous mode. Pulsed mode has reduced power consumption and reduced electromigration for enhanced reliability.

The sensing device may comprise a pressure sensing element and a flow sensing element both formed within the first dielectric membrane.

The pressure sensing element and the flow sensing element may be formed in the same dielectric membrane as each other, in other words both may be formed in a single dielectric membrane.

The at least one pressure sensing element may be used to calibrate the flow sensing element or increase its linearity, accuracy or resolution.

The sensing device may comprise a flow sensing element and a pressure sensing element on the same dielectric membrane with a structure configured to reinforce the dielectric membrane located within the dielectric membrane. This has the multi-parameter sensing capabilities of measuring pressure and flow whilst retaining the advantages of the structure configured to reinforce the dielectric membrane.

With the increased repeatability from the structure configured to reinforce the dielectric membrane, the one or more pressure sensing elements may be used to give an indication of the residual stress in the dielectric membrane. This may then be used to help the calibration of the flow sensing element. The calibration can be done during the testing of the product, by the system manufacturer (if the sensor is part of the system) or by the user (through an interface).

Similarly, the one or more pressure sensing elements can be used to detect ambient pressure fluctuations and used as compensation for flow measurements.

The sensing device may comprise two pressure sensing elements placed either side of a heater, in a symmetrical arrangement, with one pressure sensing element up stream of the heater and one pressure sensing element down stream of the heater within the flow. The pressure sensing elements may be used in a differential mode to compensate or calibrate the flow above the sensing device through a manifold that packages the sensing device. The differential pressure between the pressure sensing elements could provide better resolution or accuracy or linearity of the flow sensor. Differential pressure provides another method of measuring flow, which provides more information about the flow in order to improve accuracy or linearity as differential pressure will be affected by different physical phenomena to the thermal flow sensors.

The sensing device may comprise two pressure sensing elements that are configured to measure the differential pressure between the pressure sensing elements, which can be used to directly measure the flow, even without the need of a heating element. A channel restriction element (also referred to as a pressure drop element) may be located between the two pressing elements, either attached to the dielectric membrane or to a manifold that packages the flow sensing device. The channel restriction element may be located within a sensing channel to provide an enhancement of the pressure drop between the pressure sensing element, which increases the sensitivity of the sensing device.

The sensing device may comprise a plurality of pressure sensing elements, wherein each of the pressure sensing elements may be located at a midpoint of a perimeter side of the first dielectric membrane. The pressure sensing elements may be located at the region of highest stress within the dielectric membrane.

The sensing device may comprise a flow sensing element (which may be a heating element having tracks) located completely outside a region of highest stress within the dielectric membrane. The flow sensing element may be located generally at an angle relative to a perimeter side of the first dielectric membrane, so that the flow sensing element is not located at midpoints of the perimeter side of the first dielectric membrane. The flow sensing element may be configured to not be located at the midpoints of the perimeter sides of the membrane, allowing pressure sensing elements to be located in regions of highest stress within the dielectric membrane.

The sensing device may comprise one or more pressure sensing elements, and the first structure configured to reinforce the dielectric membrane may comprise at least one extension portion of the first structure configured to reinforce the dielectric membrane that extends in a direction from a perimeter of the first dielectric membrane towards a centre of the first dielectric membrane and wherein the extension portion of the first structure configured to reinforce the dielectric membrane overlaps one of the pressure sensing elements.

The extension portion may not extend completely from the perimeter of the first dielectric membrane to the centre of the dielectric membrane, but may just extend in a direction towards to centre of the membrane.

The at least one extension portion may function as a stress-concentrating structure that can be used to enhance the response and performance of the pressure-sensitive elements. By extending a portion of the structure configured to reinforce the dielectric membrane from region of the structure configured to reinforce the dielectric membrane located closest to the perimeter of the dielectric membrane (e.g. the structural ring) to overlap with the pressure-sensitive element, the location at the end of the extension portion of the stress-engineering structure sees the highest change in stress with the deflection of the dielectric membrane, thus enhancing the sensitivity of the device. The extension portion of the structure configured to reinforce the dielectric membrane may be referred to as peninsulas and are connected to a region of the structure configured to reinforce the dielectric membrane between the perimeter of the membrane and the pressure sensing element.

The peninsulas may be any shape (e.g. square, rectangular, filleted edges etc.) and dimensions (length and width) that provide enhanced sensitivity for the pressure-sensing element. They may be made of any material that is suitable for use in CMOS fabrication processes (e.g. tungsten, aluminium, platinum, single crystal silicon, polysilicon, etc.).

The first structure configured to reinforce the dielectric membrane may comprise at least one island portion extending from the extension portion towards a centre of the first dielectric membrane, wherein the island portion is separated from the extension portion and wherein the extension portion and the island portion both overlap one of the pressure sensing elements.

The island portion may function as a stress-concentrating structure that can be used to enhance the response and performance of the pressure-sensing elements. The one or more island portions may not be connected to the region of the structure configured to reinforce the dielectric membrane located closest to the perimeter of the dielectric membrane (e.g. the structural ring), and may be referred to as islands.

The islands are used to create a local region of high stress-concentration at locations in the dielectric membrane where pressure sensing elements may be located. The islands are separate from the structural ring and can be positioned in any location that provides enhanced sensitivity. The islands may be made of any material that is suitable for use in CMOS fabrication processes (e.g. tungsten, aluminium, platinum, single crystal silicon, polysilicon, etc.). The material of the islands may or may not be the same as the material used for the structural ring.

The sensing device may further comprise a membrane support structure extending across an entire width and length of the first dielectric membrane, wherein the membrane support structure comprises a layer having a grid or mesh structure.

A membrane support structure (also referred to as a cross-mesh structure) may be fabricated across the dielectric membrane, which enhances the mechanical properties within the dielectric membrane. The cross-mesh structure may be fabricated in any available material suitable for use in a CMOS process. The membrane support structure enhances the robustness, linearity and sensitivity of the sensing device. By providing extra structural support across the dielectric membrane, the robustness of the sensing device is improved. A common problem in thin-membrane pressure sensing devices is the 'balloon effect,' whereby there is nonlinear deformation across the membrane. The membrane support structure minimises the balloon effect, increasing the linearity of the response, which also helps to improve sensitivity due to deformation happening homogeneously across the membrane.

The number of support struts contained within the cross-mesh structure may be any number that provides mechanical benefits to the membrane. The length and width of the cross-mesh struts may also be any dimension that best enhances the performance of the device. They may be made of any material that is suitable for use in a CMOS fabrication process (e.g. tungsten, aluminium, platinum, single crystal silicon, polysilicon, etc.). The material may or may not be the same as the material used for the structure configured to reinforce the dielectric membrane.

The sensing device may comprise one or more pressure sensing elements, and the sensing device may further comprise a heater and one or more temperature sensing elements.

The heating element may be located in a centre of the membrane, and wherein the temperature sensing elements may be located at a perimeter of the first dielectric membrane.

The temperature sensing elements may be thermopiles having the hot junction on or over the first dielectric membrane and the cold junction outside the dielectric membrane and over the semiconductor substrate.

The semiconductor substrate may further comprise a second etched portion, and the dielectric layer may further comprise a second dielectric membrane located adjacent to the second etched portion of the semiconductor substrate. The sensing device may comprise at least one pressure sensing element within the first dielectric membrane and at least one flow sensing element within the second dielectric membrane. The sensing device may comprises a second structure configured to reinforce the dielectric membrane located within the second dielectric membrane.

The sensing device, in addition to at least one membrane and a structure configured to reinforce the dielectric membranes comprising any combination of the features described above, may also be designed to have one or more additional membranes containing at least flow sensing element, at least one pressure sensing element or both flow and pressure sensing features. The additional membranes may be used for compensation purposes, to improve sensor performance, to increase sensor reliability and/or for integrity assessment.

Each membrane may or may not be the same shape as the other membrane. The shapes of the dielectric membranes may be optimised independently of each other to enhance the respective performance of the flow sensing element or pressure sensing element within each dielectric membrane. Each membrane may or may not be used to measure the same physical parameter (i.e. both can be used for measuring flow, both for measuring pressure or one membrane can be used for measuring flow and another membrane can be used for measuring pressure).

The sensing device may further comprise an additional pressure sensing element and/or additional flow sensing element located within the dielectric layer and outside the dielectric membrane. The additional pressure sensing element or additional flow sensing element may be located completely over the semiconductor substrate.

Additional pressure sensing elements may be formed outside the dielectric membrane and over the semiconductor substrate, and may be configured to operate as temperature compensation devices. The additional pressure sensitive elements will have an electric output which depends only on the substrate (and therefore ambient) temperature, as the additional pressure sensing elements are not formed in the dielectric membrane and are thus not subject to mechanical stress from deformation under applied pressure.

Preferably, the additional pressure sensitive elements may be identical to the one or more pressure sensing elements located within the dielectric membrane.

The additional pressure sensitive elements may also be part of a more complex temperature compensation circuit. For example, four piezo-resistors may be connected through a Wheatstone bridge circuit, or a piezo-diode may be part of a voltage reference etc. The temperature compensation circuit may also be combined with the pressure sensing circuit. For example, four sensors located within the dielectric membrane and four sensors located over the semiconductor substrate may be connected into separate Wheatstone bridge configurations. These two Wheatstone bridge circuits may be connected to form a double Wheatstone bridge. In this case, the difference between the output of the first pair of terminals (pressure dependent+temperature dependent) and the second pair of terminals (temperature dependent) would be proportional to pressure independent of ambient temperature.

The sensing device may also comprise one or temperature sensing elements located outside the dielectric membrane and over the semiconductor substrate.

The sensing device may comprise at least two flow sensing elements within the second dielectric membrane, and the at least two flow sensing elements may be perpendicular to each other.

According to a further aspect of the present disclosure, there is provided a sensing apparatus comprising: a lid; a sensing device as described above, wherein the sensing device comprises at least two pressure sensing elements; and a flow sensing channel formed between a top surface of the dielectric layer and the lid, and wherein the flow sensing apparatus further comprises an channel restriction element within the flow sensing channel adjacent to a region of the dielectric layer between the at least two pressure sensing elements.

A channel restriction element (also referred to as a pressure drop element) may be placed between two pressure sensing elements, and may be either attached to the dielectric membrane or to the lid within the flow sensing channel. The pressure sensing elements may be used to measure a differential pressure between the two pressure sensing elements and may be used to measure flow rate through the flow sensing channel. The channel restriction element provides an enhancement of the pressure drop between the two pressure sensing elements which increases the sensitivity of the differential pressure measurement.

The channel restriction element can be located and attached to the lid. Alternatively, the channel restriction element can be located and attached to a surface of the sensing device.

The semiconductor substrate may further comprise a second etched portion, and the dielectric layer may further comprise a second dielectric membrane located adjacent to the second etched portion of the semiconductor substrate, and the sensing device may comprise at least one pressure sensing element within the first dielectric membrane and at least one additional pressure sensing element within the second dielectric membrane. The sensing device may further comprise a second structure configured to reinforce the dielectric membrane located within the second dielectric membrane. The channel restriction element may be located within the flow sensing channel adjacent to a region of the dielectric layer between the first dielectric membrane and the second dielectric membrane.

According to a further aspect of the present invention, there is provided a pressure sensing apparatus comprising a base and a pressure sensing device as described above, wherein the semiconductor substrate of the pressure sensing device may be attached to the base such that an air-right cavity is formed between the dielectric layer and the base by the etched portion of the semiconductor substrate.

The sensing device as described above may have the etched cavity of the semiconductor substrate sealed such that it is possible to create a pressure difference between a first side and a second side of the dielectric membrane. This allows an absolute value of pressure to be measured. A seal may be formed at wafer or chip level by gluing or bonding a glass, silicon wafer or metal layer to a lower surface of the semiconductor substrate or during the packaging. The membrane can also be sealed using a gel, epoxy or a film.

Alternatively, one or more holes can be formed in the dielectric membrane or the base, so that the etched cavity portion of the semiconductor substrate and a lower surface of the dielectric membrane is exposed to the package or to the ambient environment. The one or more holes may comprise etched holes through the membrane. The holes equalise pressure on both sides of the membrane and avoid catastrophic membrane failure in assembly (by pressure build up). Furthermore, because the pressure is self-equalising, it could be used for dynamic pressure measurements.

Analog/digital circuitry may be integrated on-chip. Circuitry may comprise IPTAT, VPTAT, amplifiers, switches, multiplexers, demultiplexers, analog to digital converters, memories, RF communication circuits, timing blocks, filters or any other mean to drive and read out from the heating elements, temperature sensing elements and pressure sensitive elements or electronically manipulate the sensor signals or enable/disable sensing elements. For example, it has been demonstrated that a heating element driven in a constant temperature mode results in an enhanced performance and having on-chip means to implement this driving method would result in a significant advancement of the state-of-the-art flow sensors. Also the driving method known as 3w may be implemented via on-chip means, or any other driving method, such as a constant temperature difference and time of flight, is performed to achieve specific performance (e.g. power dissipation, sensitivity, dynamic response, range, fluid property detection, etc.).

In absence of on-chip circuitry, may comprise off-chip implementation of such circuital blocks when applied to a sensing device having one or more features as described above. Such off-chip implementation may be done in an ASIC or by discrete components, or a mix of the two.

The sensing device may be packaged in a metal TO type package, in a ceramic, metal or a plastic SMD (surface mount device) package. The sensing device can also be packaged directly on a PCB, or be packaged in a flip-chip method. The sensing device may also be embedded in a substrate, such as a customised version of one of the previously mentioned package, a rigid PCB, a semi-rigid PCB, flexible PCB, or any other substrate, in order to have the device surface flush with the substrate surface. The device membrane maybe hermetically or semi-hermetically sealed with a gas (e.g. air, dry air, argon, nitrogen, xenon or any other gas) or a liquid, to engineer the thermo-mechanical properties of the device. The device may also be packaged in a vacuum. The package can also be a chip or wafer level package, formed for example by wafer-bonding.

The sensing device may have through silicon vias (TSV), to avoid the presence of bond wires in proximity of the sensitive area of the device which might affect the flow readings. Advantageously, a sensing device with TSV can enable 3D stacking techniques. For instance, the sensor chip can sit on top of an ASIC, thus reducing the sensor system size.

According to a further aspect of the disclosure, there is provided of a method of manufacturing a sensing device, the method comprising: forming at least one dielectric membrane on a semiconductor substrate comprising an etched portion, wherein the dielectric membrane is over an area of the etched portion of the semiconductor substrate; forming a pressure sensing element and/or a flow sensing element within the first dielectric membrane; and forming a first structure configured to reinforce the dielectric membrane located within the first dielectric membrane, wherein the first structure configured to reinforce the dielectric membrane has a higher stiffness than the first dielectric membrane, and wherein the first structure configured to reinforce the dielectric membrane is located between a perimeter of the dielectric membrane and the pressure sensing element or flow sensing element.

BRIEF DESCRIPTION OF THE DRAWINGS

Some embodiments of the disclosure will now be described by way of example only and with reference to the accompanying drawings, in which.

DETAILED DESCRIPTION OF THE PREFERRED EMBODIMENTS

Some examples of the disclosed device are given in the accompanying figures.

Figure 1:
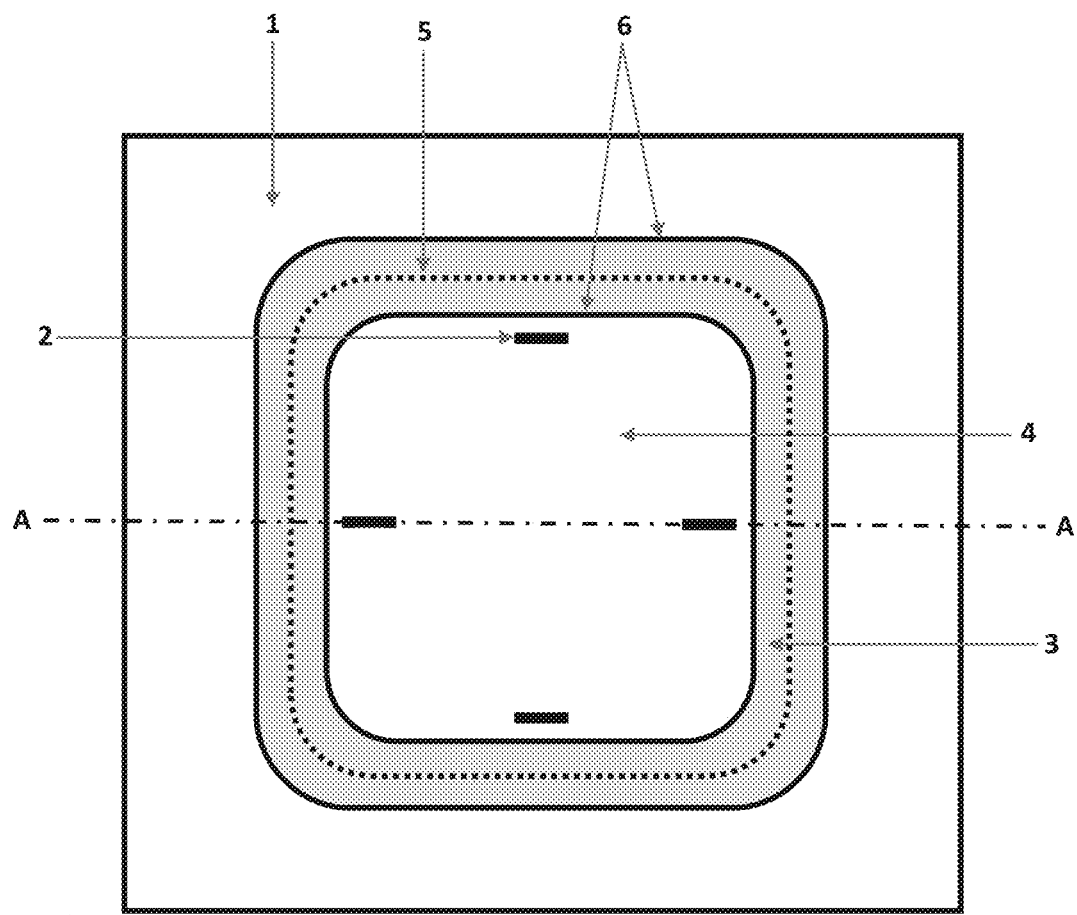
FIG. 1 shows a top view of a sensing device with pressure sensing elements and a stress-engineering structure in the shape of a structural ring, according to an embodiment of the disclosure.
Figure 2:
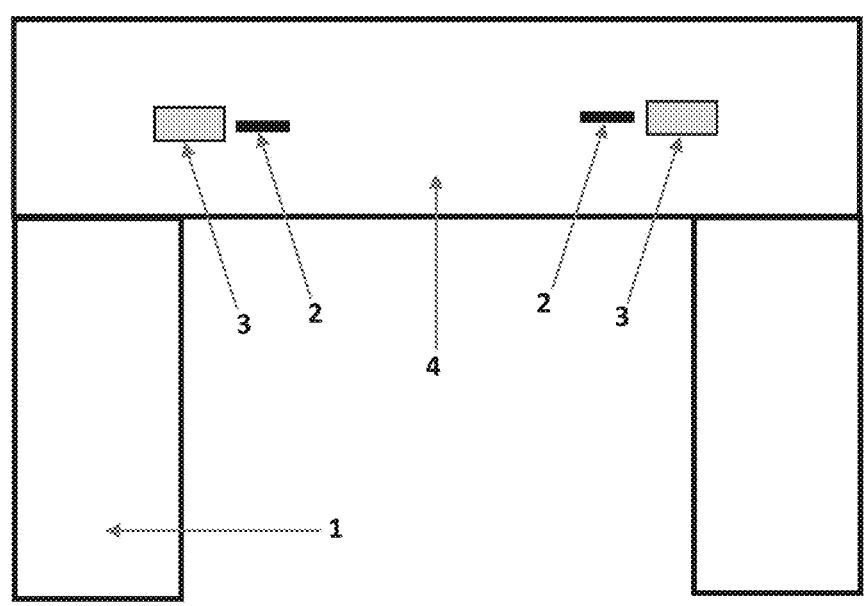
FIG. 2 shows a cross-section of the sensing device of FIG. 1.

FIGS. 1 & 2 show the top view and cross-section (through cut-line A-A) of the first embodiment of a sensing device, respectively. The sensing device has a substrate 1, which could be made from a semiconductor material such as silicon, a membrane 4 which contains one or more dielectric layers and at least one pressure sensing element 2. A metal layer (e.g. tungsten, platinum, aluminium) within the membrane is used to create a structure configured to reinforce the dielectric membrane (also referred to as a stress engineering structure, and shown in this embodiment as a structural ring) 3 with the structural ring edges labelled as 6, which may or may not overlap the membrane edge 5.

The pressure sensing elements 2 can be piezoresistors, made with single crystal silicon or polysilicon. The pressure sensing elements 2 are located at or about the midpoint of each perimeter side of the dielectric membrane 4 and adjacent to a perimeter edge of the membrane 4. This region of the membrane 4 has the highest stress, so placing the pressure sensing elements 2 in this configuration increases the sensitivity of the device.

In this embodiment, the structural ring 3 is formed partly within the dielectric membrane 4 and partly outside the dielectric membrane, but within the dielectric layer over the semiconductor substrate 1. The structural ring 3 is located between the pressure sensing elements 2 and the edge of the dielectric membrane 4.

The membrane 4 is defined through back-etching using dry or wet etching techniques. When there is a pressure difference between the two sides of the membrane 4, deflection is caused and is measured by the pressure sensing elements 2.

The structural ring 3 is formed of a material having a higher stiffness than the dielectric membrane 4 material.

The structural ring 3 has the advantage of both a high structural rigidity and excellent fabrication tolerances. This results in a more uniform stress across the dielectric membrane 4. This also results in a more accurately defined membrane perimeter, which allows enhanced sensor-to-sensor repeatability by negating the problem of over- and under-etching.

Figure 3:
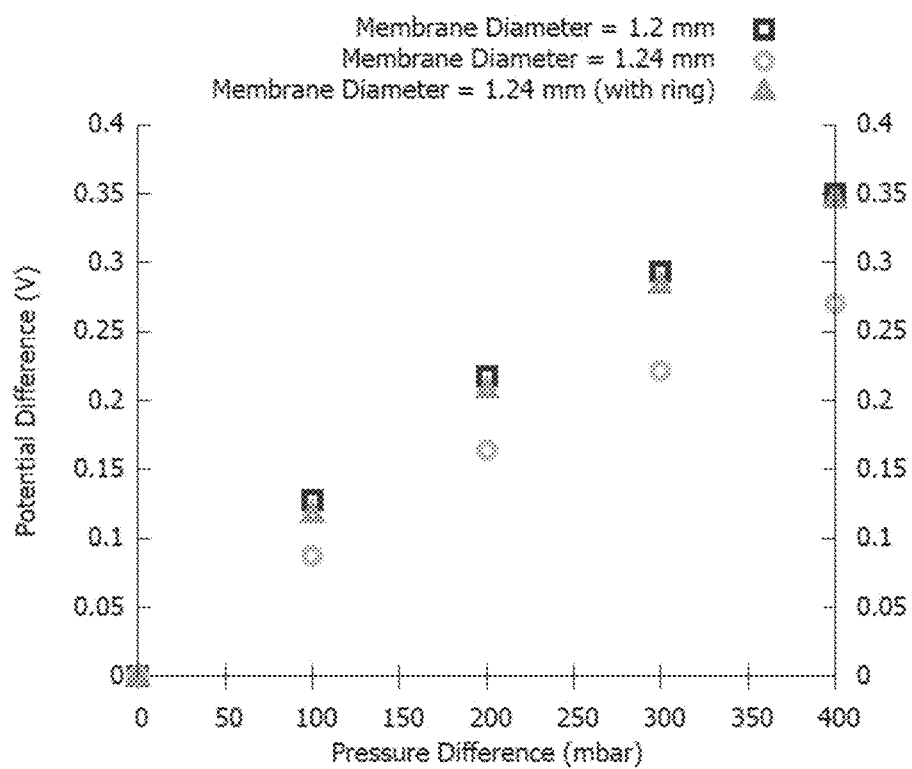
FIG. 3 shows experimental evidence showing the performance of the stress-engineering structure.

FIG. 3 shows the voltage output from three fabricated sensors. The two sensors with different membrane sizes show a different sensitivity with change in pressure difference. A third device has a structural ring included, with the same size and shape as the smaller membrane and shows the effect of over etching by 40 μm successfully negated.

Figure 4:
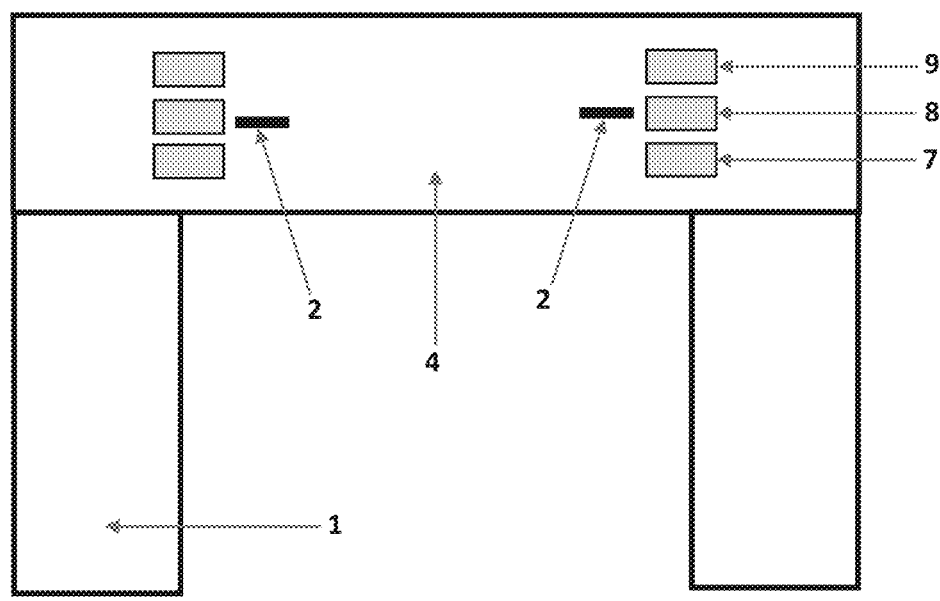
FIG. 4 shows a cross section of a sensing device in which 3 metal layers are used for the fabrication of the stress-engineering structure, according to a further embodiment of the disclosure.

FIG. 4 shows a cross-section of a further embodiment of the sensing device across the cut line A-A (as shown in FIG. 1) comprising a substrate 1, a membrane 4 that comprises at least one pressure sensing element 2 and utilises 3 distinct metal layers 7, 8, 9 for the fabrication of the structural ring. The use of three distinct layers 7, 8, 9 for the structural rings increases the stiffness of the stress engineering structure and improves the reproducibility and the performance of the sensing device.

Figure 5:
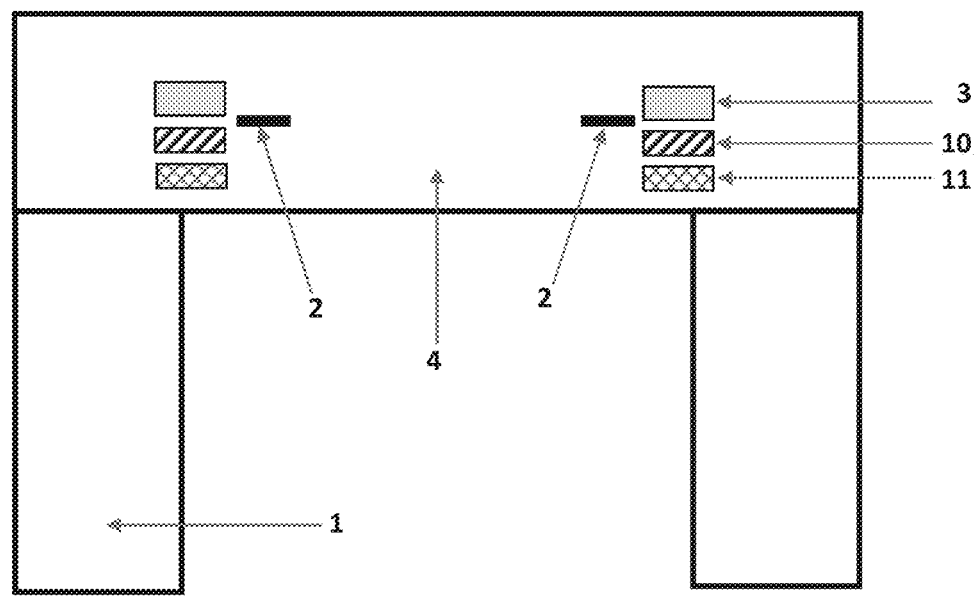
FIG. 5 shows embodiment cross-section of a sensing device where the stress-engineering structure is made from 3 different materials, in this example metal, polysilicon and single crystal silicon, according to a further embodiment of the disclosure.

FIG. 5 shows a cross-section of a further embodiment of the sensor across the cut line A-A (as shown in FIG. 1) comprising a substrate 1, a membrane 4 that comprises at least one pressure sensing element 2 and utilises three layers of different materials. In this example, the layers are 3 (metal), 10 (polysilicon) and 11 (single crystal silicon) for the fabrication of the structural ring.

The sensing device shown in FIG. 4 and FIG. 5 use multiple layers in the membrane stack to improve the robustness and effectiveness of the structural ring 3. FIG. 4 uses more than one metal layer 7, 8, 9, or as in this case of FIG. 4, three metal layers in the fabrication of the structural ring, whilst FIG. 5 takes advantages of using other available materials in the contribution to the structural ring.

Figure 6:
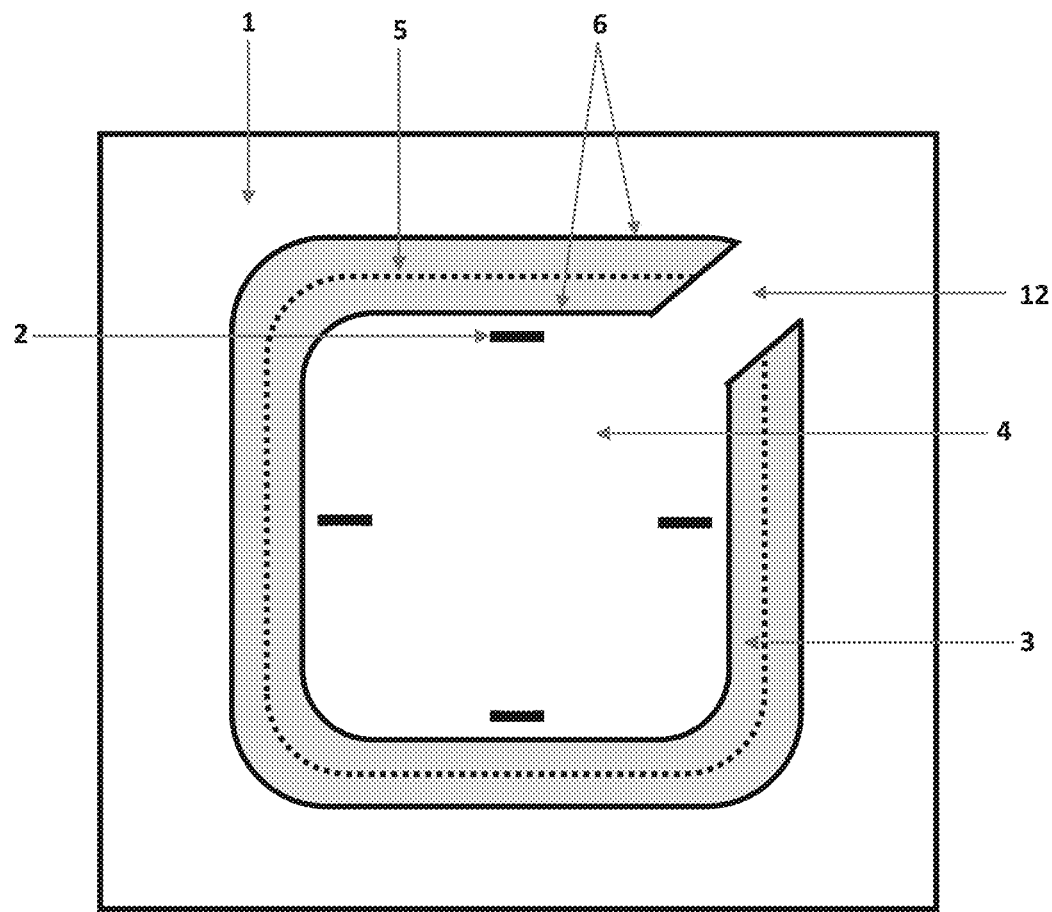
FIG. 6 shows a top view of a sensing device where the stress-engineering structure is a discontinuous structural ring, according to a further embodiment of the disclosure.

FIG. 6 shows a top view of a further embodiment of the sensing device comprising a substrate 1, a membrane 4 that comprises pressure sensing elements 2, a stress-engineering structure 3 (i.e. structural ring with edges labelled as 6) where there is a gap in the structural ring 12 making it discontinuous.

Figure 7:
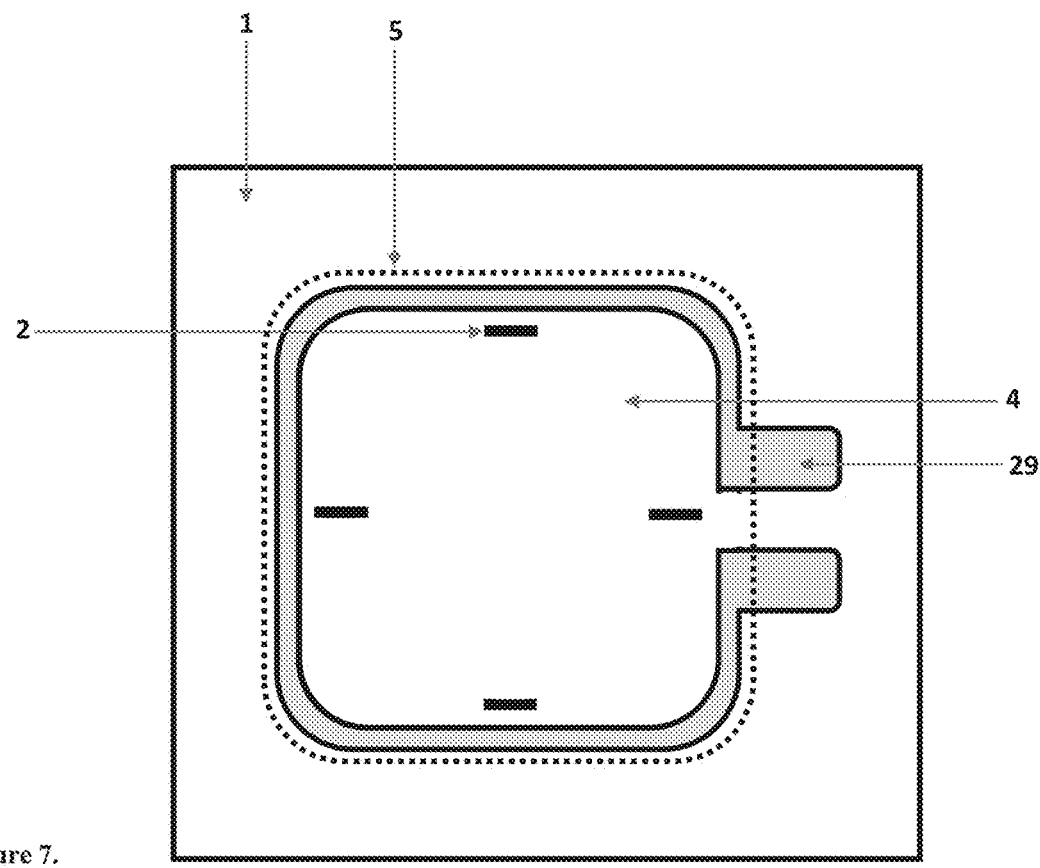
FIG. 7 shows a top view of a sensing device, in which the structure configured to reinforce the dielectric membrane is configured to operate as a resistor, according to a further embodiment of the disclosure.

FIG. 7 shows the top-view of a further embodiment of the sensing device, whereby there is a substrate 1 that comprises a membrane 4, comprising pressure-sensitive elements 2, membrane edge 5 and a stress-engineering structure that can be used as a resistor 29.

This embodiment allows the user to measure the resistance of the stress-engineering structure 29 that follows the membrane 4 perimeter. If there are membrane cracks, which happen at the membrane edge most frequently, the measured resistance of this resistor 29 will be much higher, and the crack may be detected. This allows the early detection of cracks and thus will improve the yield of devices after final testing.

Figure 8:
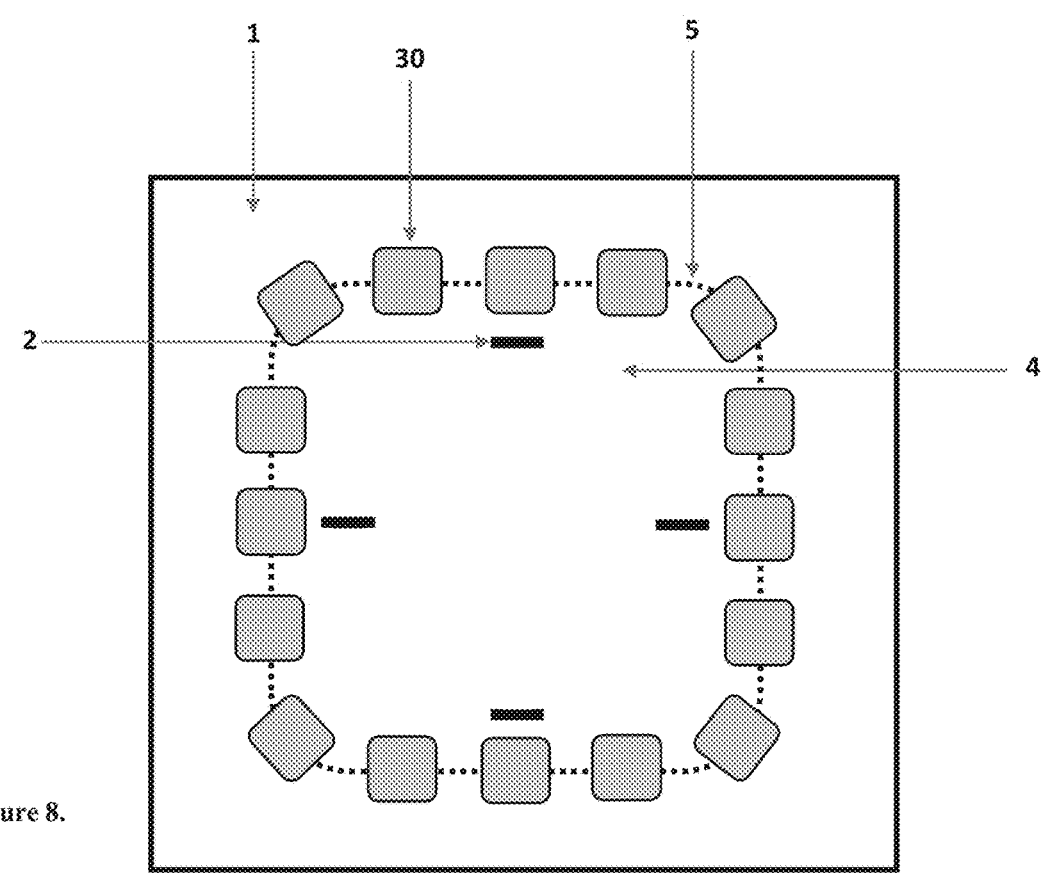
FIG. 8 shows a top view of a sensing device, where the structure configured to reinforce the dielectric membrane comprises ring of separate elements and gaps between the separate elements, according to a further embodiment of the disclosure.

FIG. 8 shows the top-view of a further embodiment of the invention whereby there is a substrate 1 that comprises a membrane 4 that comprises pressure sensing elements 2, a membrane edge 5 and a stress-engineering structure including a series of separate elements 30 around the membrane 4, which are referred to as anchors 30. The anchors 30 extend round the perimeter of the membrane 4, with gaps between the separate elements 30. The anchors 30 provide enhanced structural rigidity of the membrane 4 and help to homogenise the stress across the membrane 4.

Figure 9:
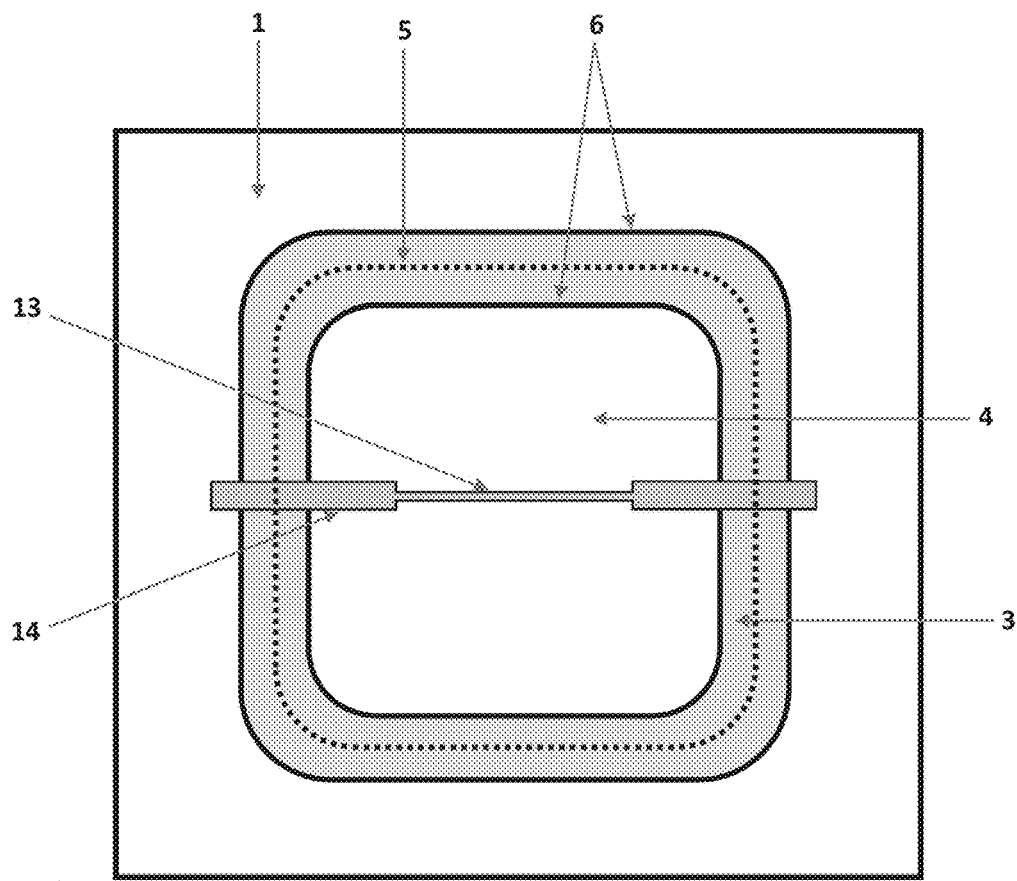
FIG. 9 shows a top view of a sensing device, whereby there is a flow sensing element in combination with the stress-engineering structural ring, according to a further embodiment of the disclosure.

FIG. 9 shows a top view of a further embodiment of the sensing device comprising a substrate 1, a membrane 4 that comprises a structural ring 3 (with structural ring edges labelled as 6), a flow sensing element 13, tracks 14 and membrane edge 5.

The flow sensing element 13 can be a resistor which can be used as a heater and/or temperature sensor.

The structural ring 3 is used in conjunction with the flow sensing element 13 in order to negate the effect of over- and under-etching of the membrane 4. With a more accurate and more repeatable membrane perimeter, the residual stresses across the membrane 4 will be both more uniform and more consistent across devices. This will increase the robustness of the flow sensing device as well as minimising the device-to-device variation, resulting in a more accurate and repeatable sensing device in high-volume production.

Figure 10:
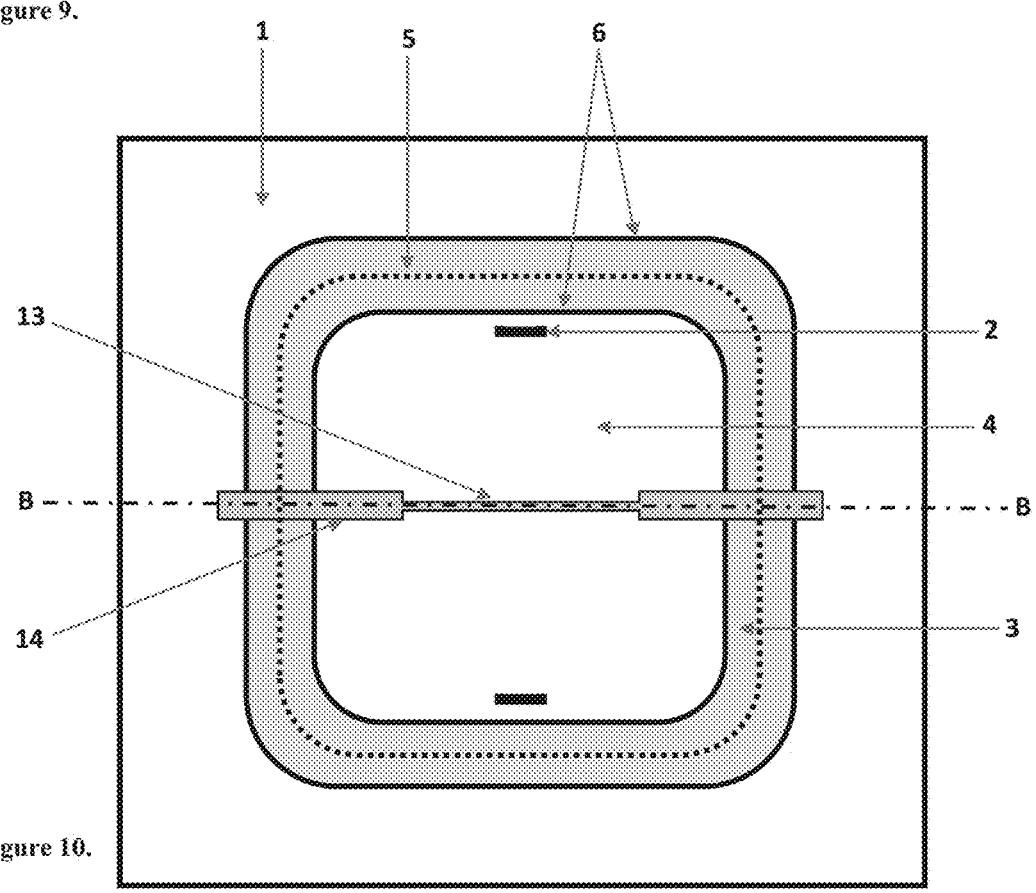
FIG. 10 shows a top view of a sensing device where both pressure sensing elements and a flow sensing element are located within the same dielectric membrane in combination with the stress-engineering structural ring, according to a further embodiment of the disclosure.

FIG. 10 shows the top view of a further embodiment of the sensor comprising a substrate 1, a membrane 4 comprising a structural ring 3 (with structural ring edges labelled as 6), pressure sensing elements 2 and a flow sensing element 13.

Figure 11:
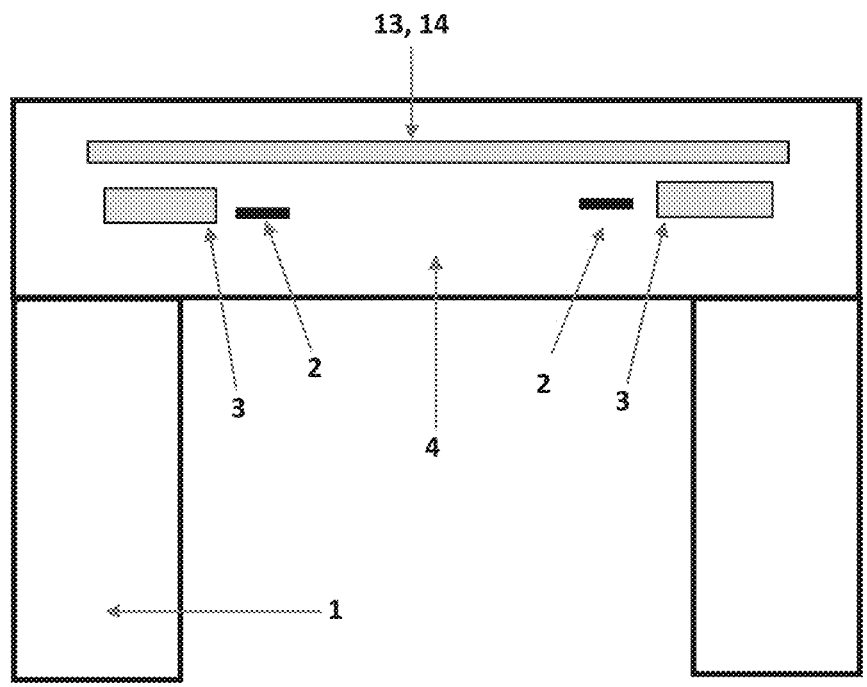
FIG. 11 shows a cross-section of the sensing device of FIG. 10.

FIG. 11 shows the cross section of the sensing device of FIG. 10 across the cut-line B-B comprising a substrate 1, a membrane 4 comprising a structural ring 3, pressure sensing elements 2 and a flow sensing element 13.

FIG. 10 and FIG. 11 show an embodiment of the sensing device where there are both pressure 2 and flow sensing elements 13 fabricated in conjunction with the structural ring 3. This embodiment presents all the advantages of the structural ring 3 whilst also being able to measure both pressure and flow on a single device.

This has two advantages: (i) the pressure sensing elements 2 can be used to compensated for ambient pressure fluctuations that effect flow readings and (ii) the pressure sensing elements 2 can be used to measure residual stress in the membrane and be helped to calibrate the flow sensing element 13.

The differential pressure between the pressure sensing elements 2 could be used to provide better resolution or accuracy or linearity of the flow sensor. The differential pressure method can be used to directly measure the flow, even without the need of a heater.

Figure 12:
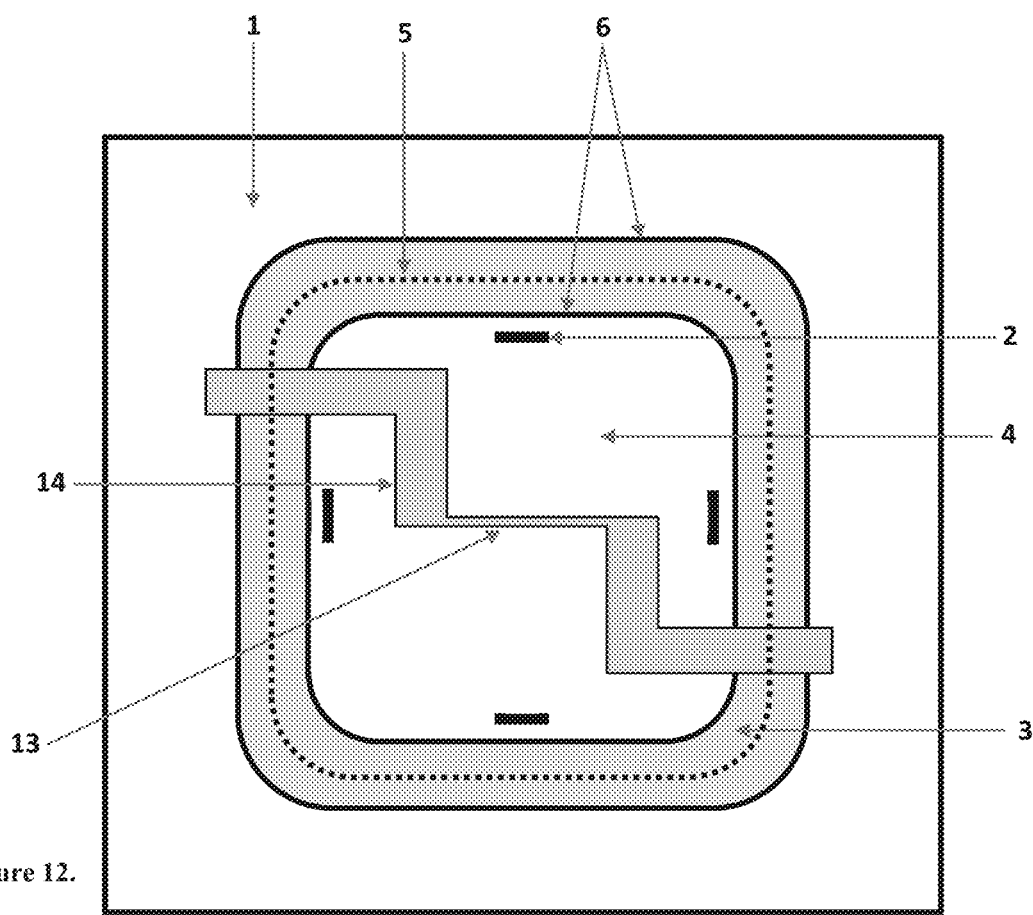
FIG. 12 shows a top view of a sensing device whereby the flow sensing element tracks are bent and 4 pressure sensing elements are included in the areas of the dielectric membrane having highest sensitivity, according to a further embodiment of the disclosure.

FIG. 12 shows the top view of a preferred embodiment of the sensor comprising a substrate 1, a membrane 4 comprising a structural ring 3 (with structural ring edges labelled as 6), four pressure sensing elements 2 and a flow sensing element 13, where the flow sensing element tracks 14 are angled.

The tracks 14 of the flow sensing element 13 extend from one corner of the dielectric membrane 4 to an opposite corner of the dielectric membrane 4. The tracks 14 from the flow sensing element 13 are positioned to be completely outside the regions of the membrane having the highest stress, in order to allow four pressure-sensing elements 2 to be located in the areas of highest stress (the midpoints of the perimeter sides of the membrane 4). The tracks 14 may be bent or straight and angled relative to the sides of the dielectric membrane 4, in order for the tracks 14 to avoid the regions of highest stress within the dielectric membrane 4.

By arranging the tracks 14 of the flow sensing element 13 in this configuration, this embodiment allows the pressure sensing elements 2 to be positioned in the areas that they will provide the highest sensitivity. It also allows for the positioning of four pressure sensing elements 2 in their conventional locations for the implementation of a Wheatstone bridge read-out circuitry.

Figure 13:
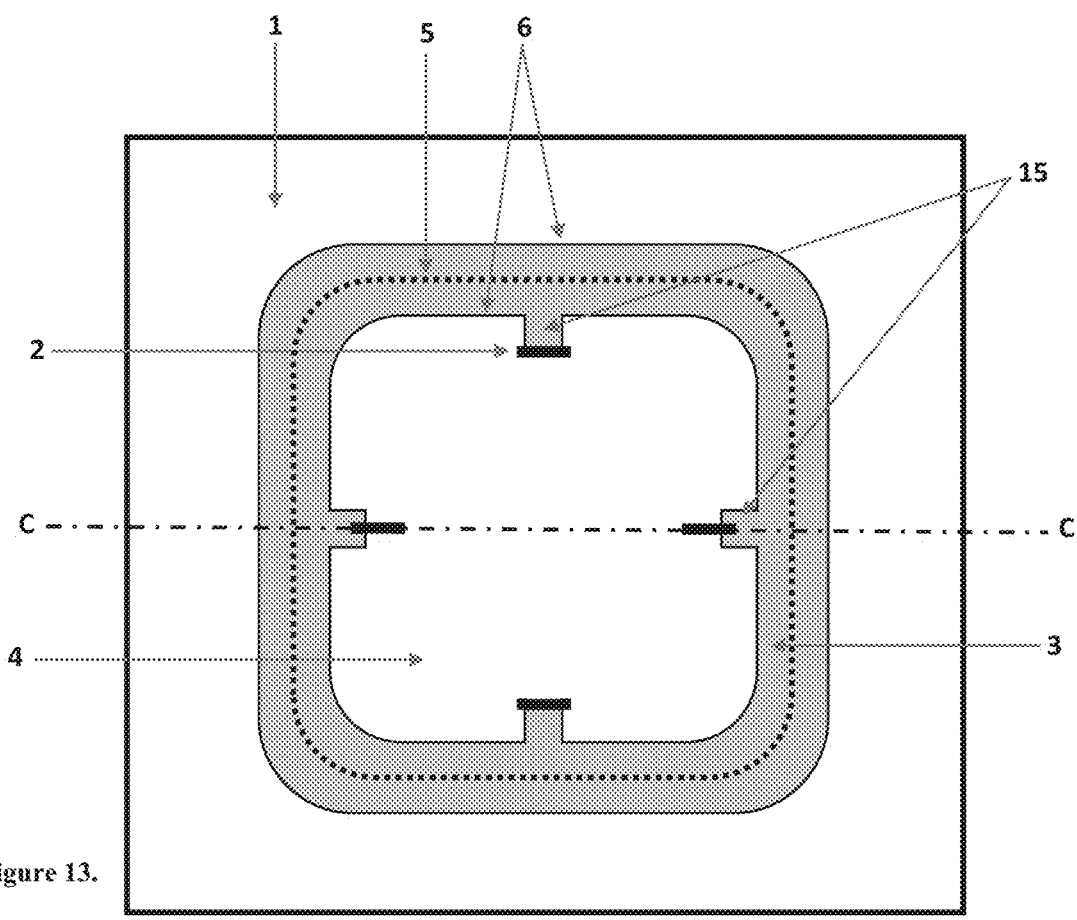
FIG. 13 shows a top view of a sensing device wherein the stress-engineering structure comprises extension portions, according to a further embodiment of the disclosure.
Figure 14:
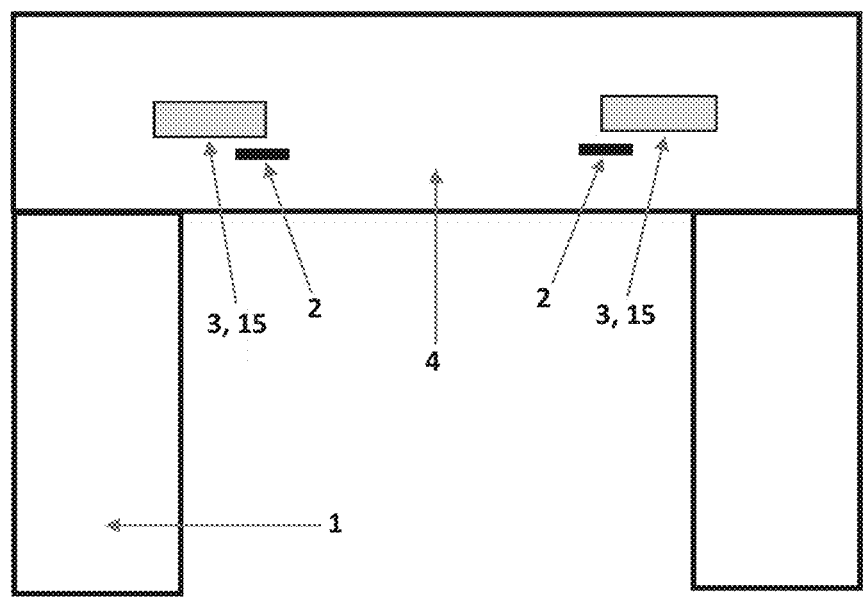
FIG. 14 shows a cross-section of the sensing device of FIG. 13.

FIGS. 13 and 14 show a top view and a cross section of a further embodiment of the sensing device comprising a substrate 1, a membrane 4, pressure sensing elements 2, and a structural ring 3 (with structural ring edges labelled as 6), where the stress-engineering structure 3 comprises extension portions 15. The extension portions 15 extend from the structural ring 3 towards the centre of the membrane 4 and overlap the pressure sensing elements 2.

FIG. 13 and FIG. 14 show a further embodiment of the sensing device whereby the stress engineering structure 3 has extension portions 15 acting as stress-concentrating structures which enhance the response and performance of the pressure-sensing elements 2. By arranging the extension portions 15 to overlap with the pressure-sensing elements 2, the location at the end of the peninsula 15 sees the highest change in stress with the deflection of the membrane 4, thus enhancing the sensitivity of the device.

Figure 15:
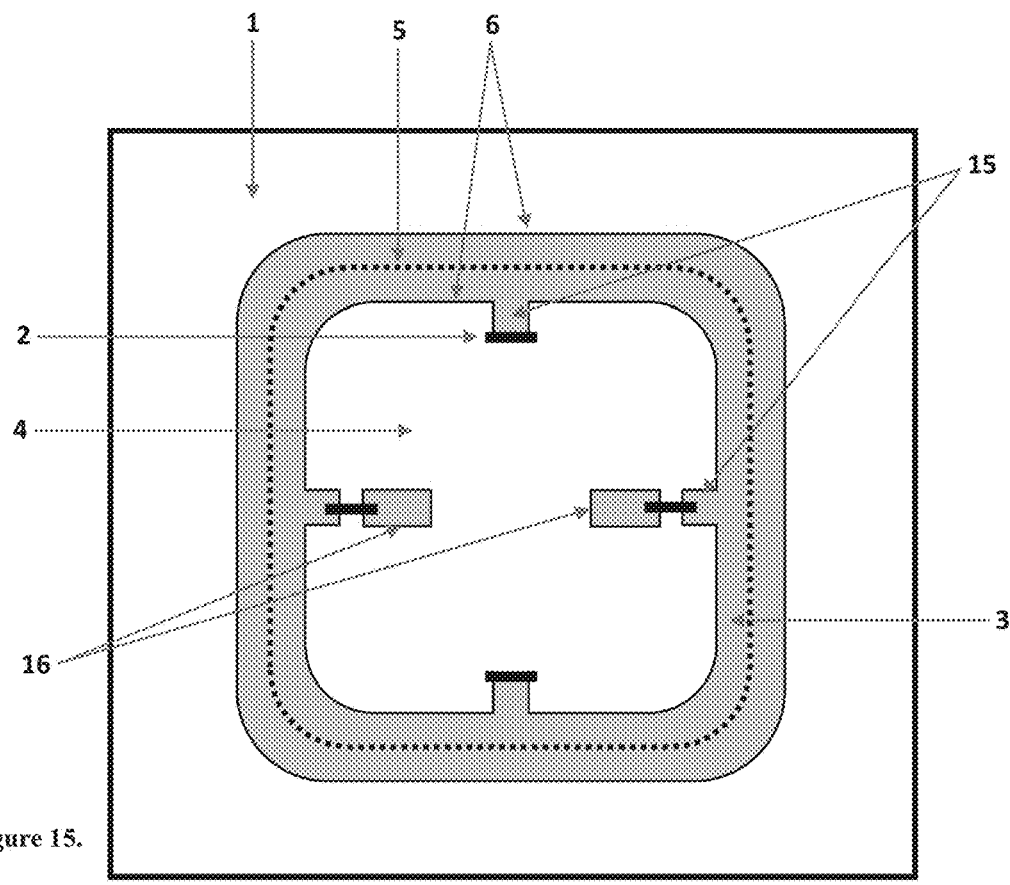
FIG. 15 shows a top view of a sensing device where the structure configured to reinforce the dielectric membrane comprises island portions that are not connected to the structural ring, according to a further embodiment of the disclosure.

FIG. 15 shows the top view of a further embodiment of the sensing device comprising a substrate 1, a membrane 4, pressure sensing elements 2, and a structural ring 3 (with structural ring edges labelled as 6), and having stress-concentrating structures connected to the structural ring (referred to as extension portions or peninsulas) 15 and stress-concentrating structures not connected to the structural ring (referred to as island portions or islands) 16.

The islands portions 16 function in a similar way as the extension portions 15, by concentrating the stress at a specific location on the membrane 4, namely at the location of the pressure sensing elements 2. In this embodiment shown, both extension portions 15 and island portions 16 are used, which concentrate the stress on opposing sides of each of the pressure sensing elements 2 therefore further increasing the sensitivity of the sensing device. The islands 16 are not connected to the structural ring 3 and thus have more design space for geometry and location optimisation.

Figure 16:
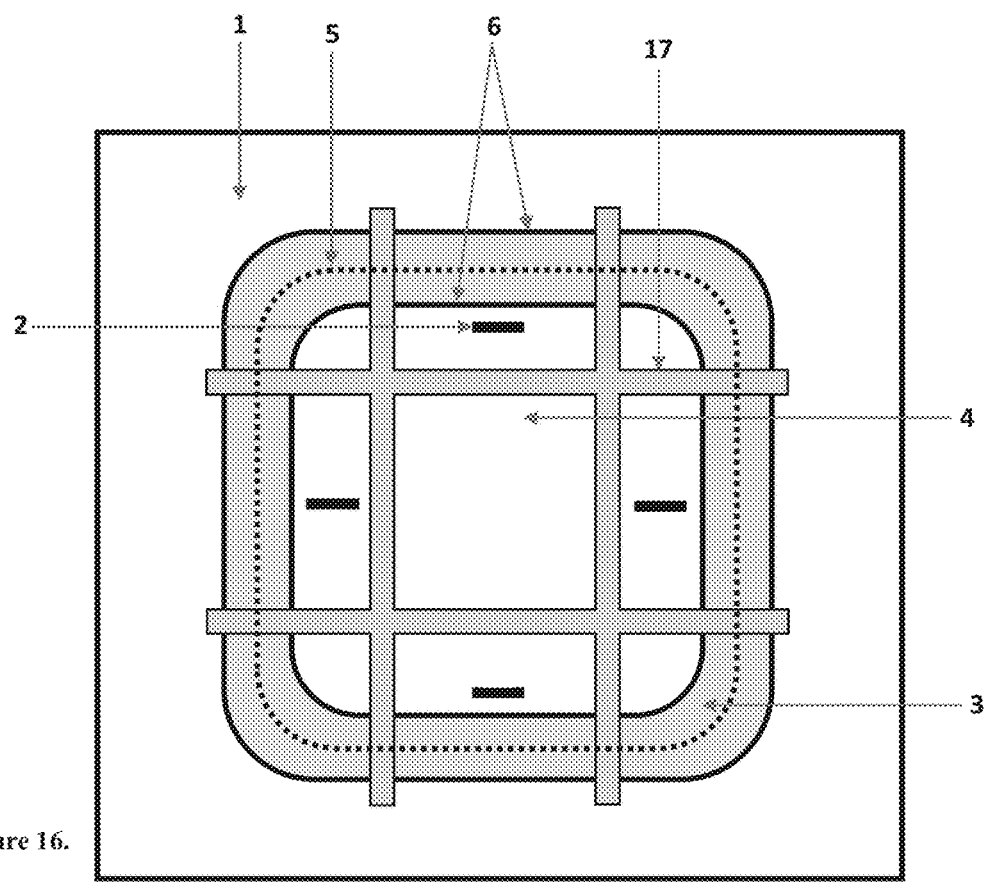
FIG. 16 shows top view of a sensing device, where the sensing device comprises a cross mesh membrane support structure, according to a further embodiment of the disclosure.

FIG. 16 shows the top view of an embodiment of the sensor comprising a substrate 1, a membrane 4, pressure sensing elements 2, and a structural ring 3 (with structural ring edges labelled as 6), and a stress-engineering cross-mesh pattern within the metal layer 17 (also referred to as a membrane support structure).

The cross-mesh pattern 17 is fabricated in one of the available metal layers of the membrane 4 and is used to enhance the robustness, linearity and sensitivity of the membrane 4. By providing extra structural support across the membrane 4, the robustness of the sensor is improved. A common problem in thin-membrane pressure sensing is the balloon effect, whereby there is nonlinear deformation across the membrane 4. This structural support from the cross-mesh pattern 17 minimises the balloon effect, increasing the linearity of the response, which also helps to improve sensitivity due to deformation happening homogeneously across the membrane 4.

Figure 17:
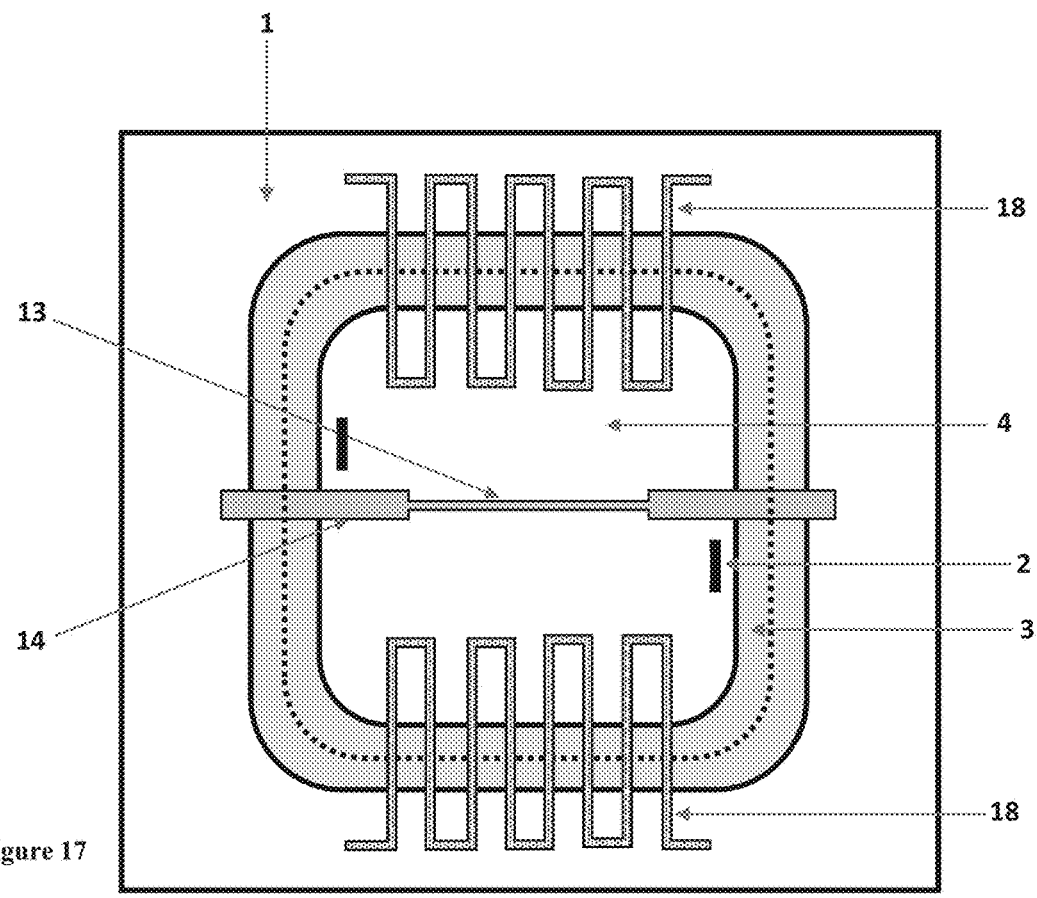
FIG. 17 shows top view of a sensing device whereby the flow sensing element is configured to be used in calorimetric mode, according to a further embodiment of the disclosure.

FIG. 17 shows the top view of a further embodiment of the sensor comprising a substrate 1, a structural ring 3 (with structural ring edges labelled as 6), and a membrane that comprises pressure sensing elements 2, a heating element 13 and temperature sensing elements 18.

This embodiment has the ability to measure both flow and pressure, in conjunction with the advantages of the structural ring. The flow sensing elements (comprising the heating element 13 and the temperature sensing elements 18) utilise the calorimetric method, which offers the advantage of bi-directional flow measurement. The calorimetric method uses temperature sensors on either side of the heater to measure the temperature distribution caused by the flow rate in conjunction with the heater.

In this embodiment, the temperature sensing elements 18 are thermopiles having a first junction within the dielectric membrane 4 and a second junction over the semiconductor substrate 1. The temperature sensing elements 18 are located on opposite perimeter sides of the membrane 4, and the heating element 13 is located in between the two temperature sensing elements 18.

Figure 18:
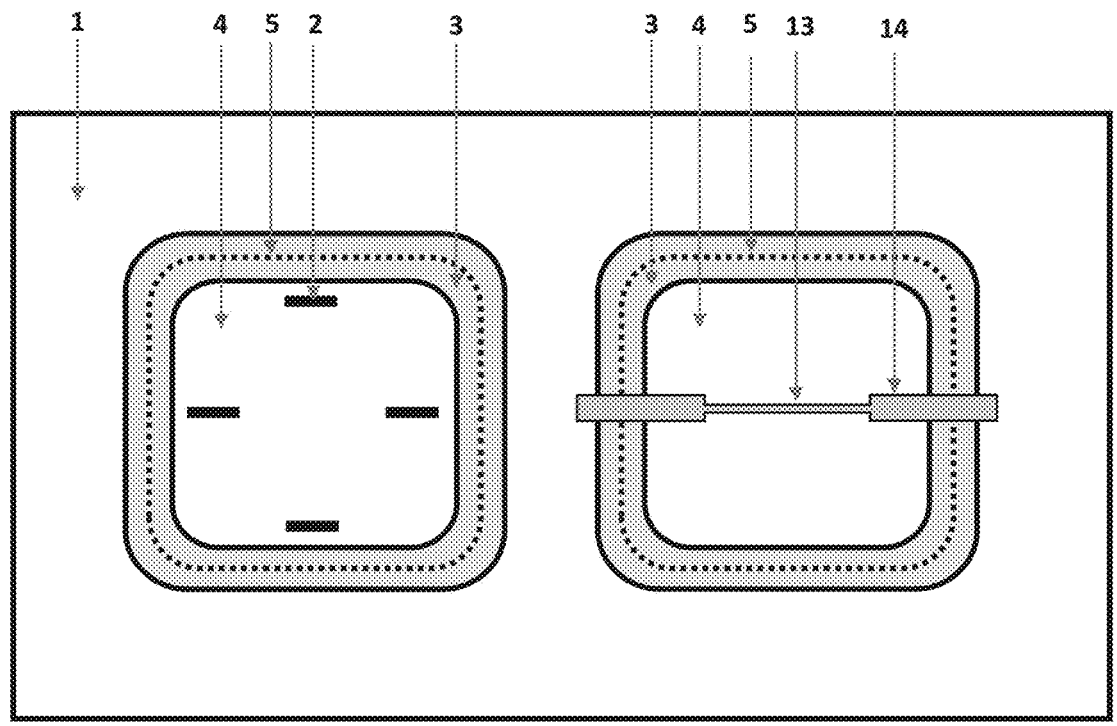
FIG. 18 shows a sensing device having two dielectric membranes, each having a stress-engineering structural ring. In this embodiment, a first dielectric membrane has embedded pressure sensing elements whilst the second dielectric membrane has an embedded flow sensing element.

FIG. 18 shows the top view of a further embodiment of the sensor comprising a substrate 1, two structural rings 3, and two membranes 4. Each membrane 4 is located over a separate etched cavity portion of the semiconductor substrate 1. A first dielectric membrane comprises pressure sensing elements 2 whilst a second dielectric membrane has a flow sensing element 13.

This embodiment contains two membranes 4, formed by etching two cavity portions in a single semiconductor substrate 1, where each membrane 4 is designed for sensing a different physical parameter. This provides the capability of independently measuring both flow and pressure from one sensing device. Pressure measurements may be used to compensate the flow measurements, and vice versa. This can be used in many applications in which both parameters are important and can affect one another.

Figure 19:
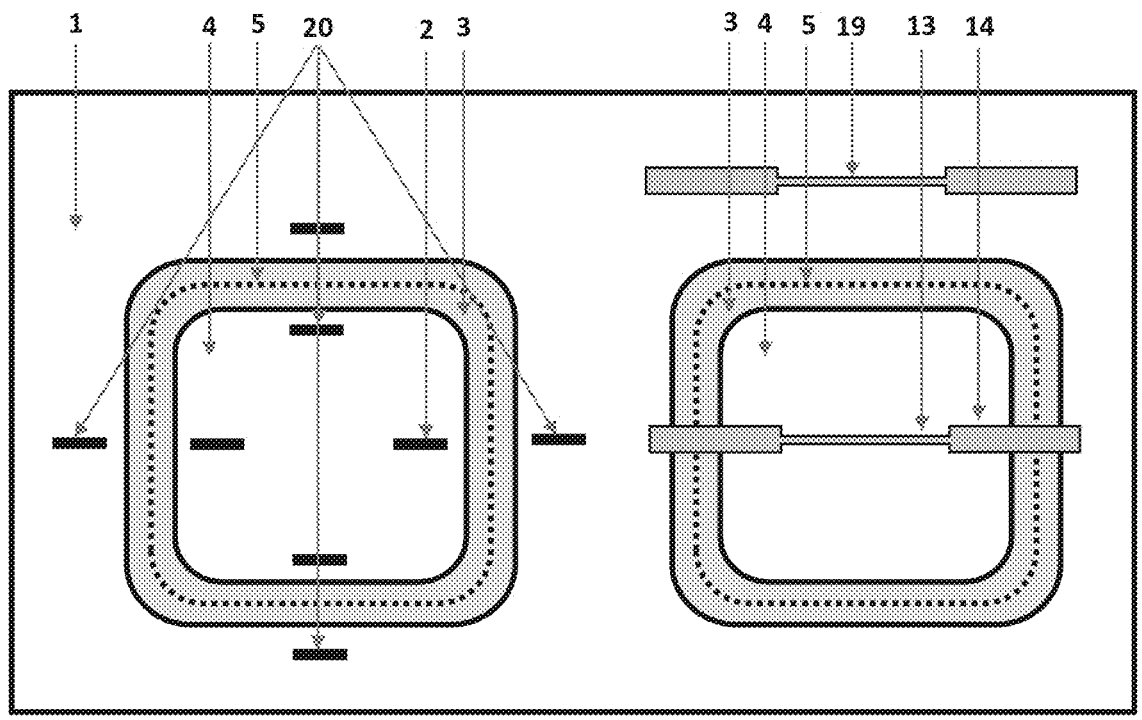
FIG. 19 shows a sensing device having additional flow sensing elements and pressure sensing elements located on the semiconductor substrate, according to a further embodiment of the disclosure.

FIG. 19 shows a top view of a further embodiment of the sensor comprising a substrate 1, two structural rings 3, and two membranes 4. A first membrane comprises pressure sensing elements 2 whilst a second membrane contains a flow sensing element 13. This embodiment also contains pressure sensing elements 20 and flow sensing 19 elements that are located on the substrate, outside both of the dielectric membranes 4.

This embodiment embeds pressure and flow sensing elements 19, 20 outside the dielectric membrane 4, located over the substrate. The pressure and flow elements 19, 20 outside of the dielectric membrane will not be affected by pressure or flow, unlike the same elements located within the membrane. The pressure and flow elements 19, 20 outside of the dielectric membrane 4 will only be affected by the ambient temperature. It is for this reason that these elements can be used for ambient temperature compensation.

Figure 20:
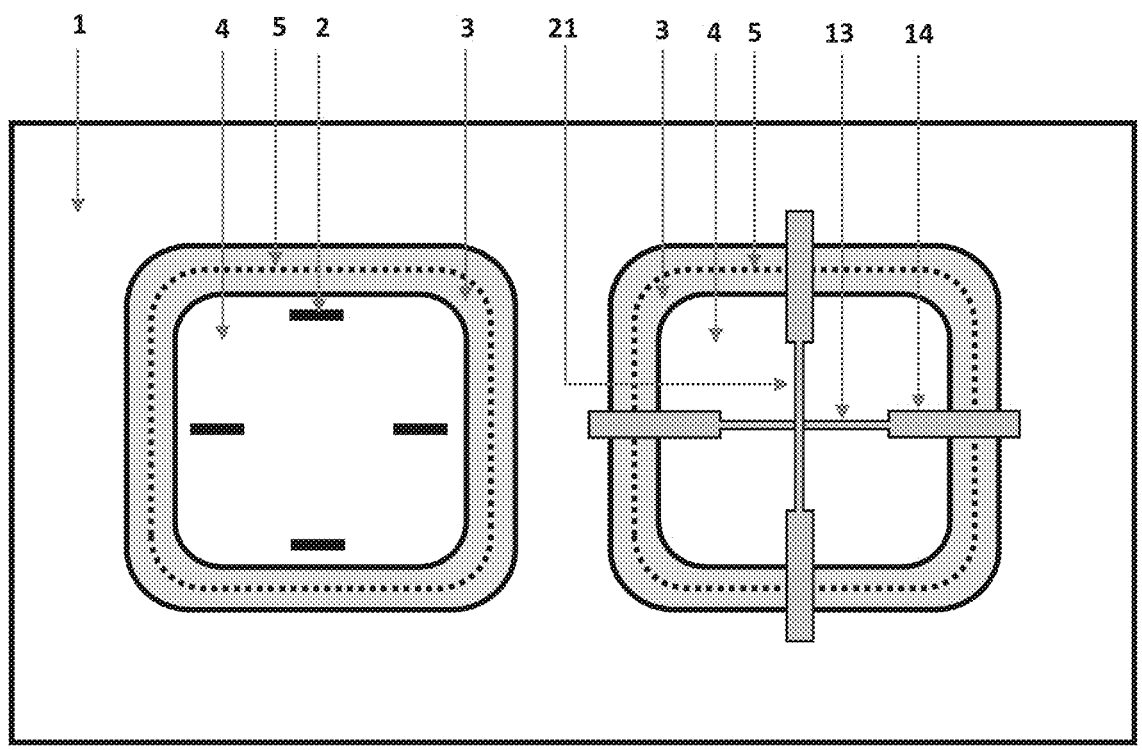
FIG. 20 shows a sensing device having two flow sensing elements that are perpendicular to one another in one dielectric membrane, according to a further embodiment of the disclosure.

FIG. 20 shows the top view of a further embodiment of the sensor comprising a substrate 1, two structural rings 3, and two membranes 4. A first membrane comprises pressure sensing elements 2 whilst a second membrane has two flow sensing elements 13, 21, which are perpendicular to each other.

This embodiment embeds two flow sensing elements 13, 21 in the dielectric membrane that are perpendicular to one another, which provides the ability of multi-directional flow-sensing.

Figure 21:
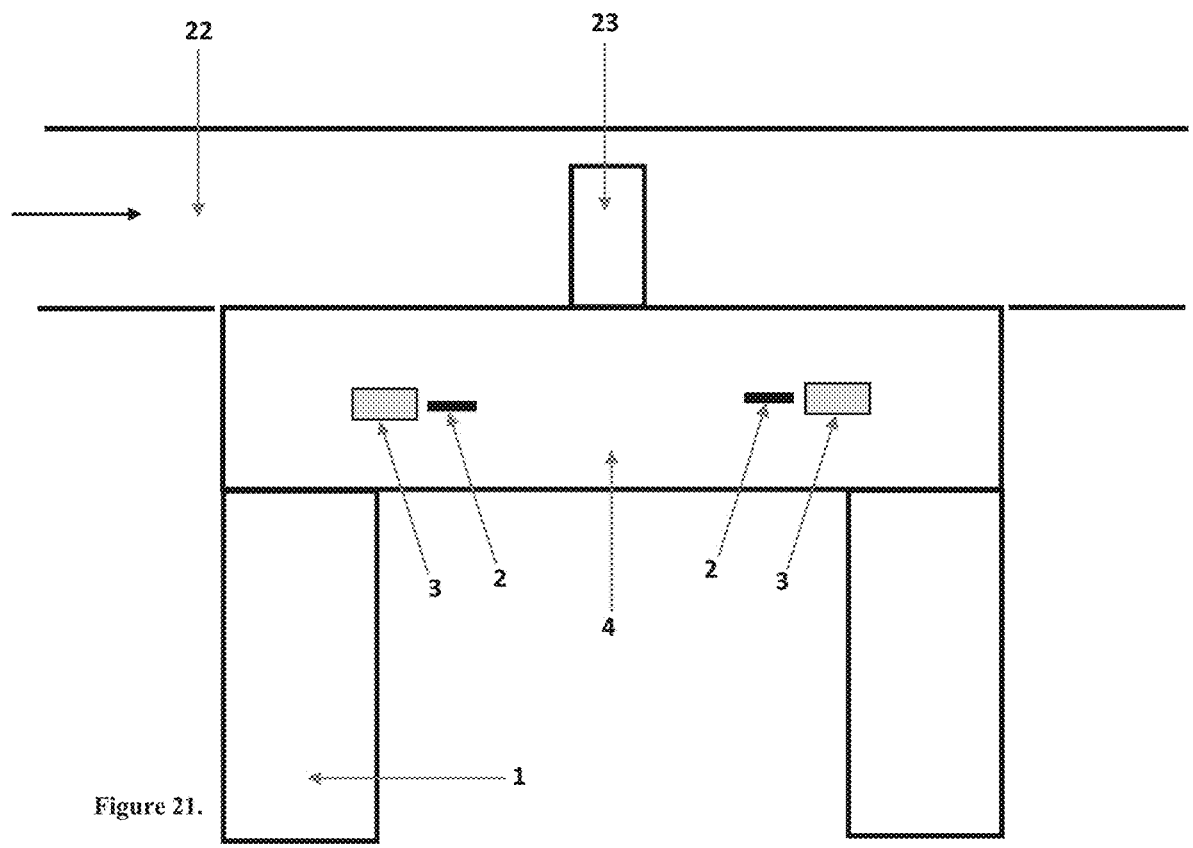
FIG. 21 shows a sensing apparatus with a flow sensing channel located on top of the sensing device, and a channel restriction element located on the dielectric membrane, according to a further embodiment of the disclosure.

FIG. 21 shows a cross section view of an embodiment of a sensor assembly that has a flow sensing channel 22 located on top of a sensing device comprising a substrate 1, pressure sensing elements 2, a stress-engineering structure (for example, a structural ring) 3, a dielectric membrane 4 and a pressure drop element 23 located within the flow sensing channel 22, on a top or front surface of the dielectric membrane 4, and between the two pressure sensing elements 2.

Within this embodiment, the differential pressure between the pressure sensing elements 2 may be used to directly measure the flow rate. A pressure drop element 23 is located between the two pressure sensing elements 2, and is attached to the membrane 4, within the flow sensing channel 22. The pressure drop element 23 (also referred to as a channel restriction element) reduces the flow over the sensing device between the pressure sensing elements 2. This provides an enhancement of the pressure difference between the two pressure sensing elements 2 and thus results in higher sensitivity for flow measurements. Manufacturing the channel restriction element 23 on the membrane 4 has the advantage that it has a higher tolerance than manufacturing the channel restriction element 23 on the lid of the flow sensor assembly.

Figure 22:
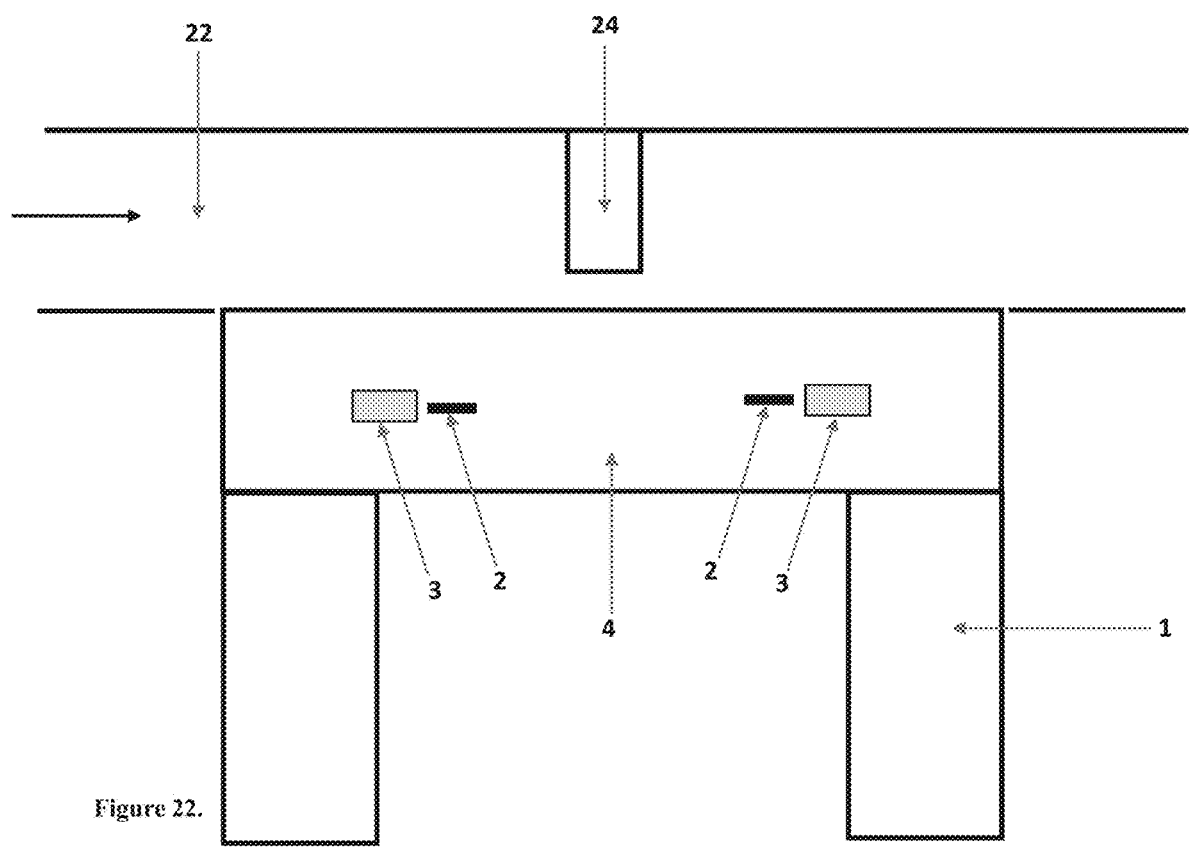
FIG. 22 shows a sensing apparatus with a channel restriction element located on a lid of the flow sensing apparatus, according to an embodiment of the disclosure.

FIG. 22 shows a cross section view of a further embodiment of a flow sensor assembly that has a flow sensing channel 22 comprising a pressure drop element 24, where the flow channel is located on top of a sensing device comprising a substrate 1, pressure sensing elements 2, stress-engineering structure (structural ring) 3, membrane 4.

Similar to FIG. 21, within this embodiment, the differential pressure between the pressure sensing elements 2 may be used to directly measure the flow rate. A pressure drop element 23 is located in the flow sensing channel 22 between the pressure sensing elements 2, and is attached to the manifold (for example, the lid of the flow sensing assembly). This provides an enhancement of the pressure difference between the two pressure sensing elements 2 and thus results in higher sensitivity for flow measurements.

Figure 23:
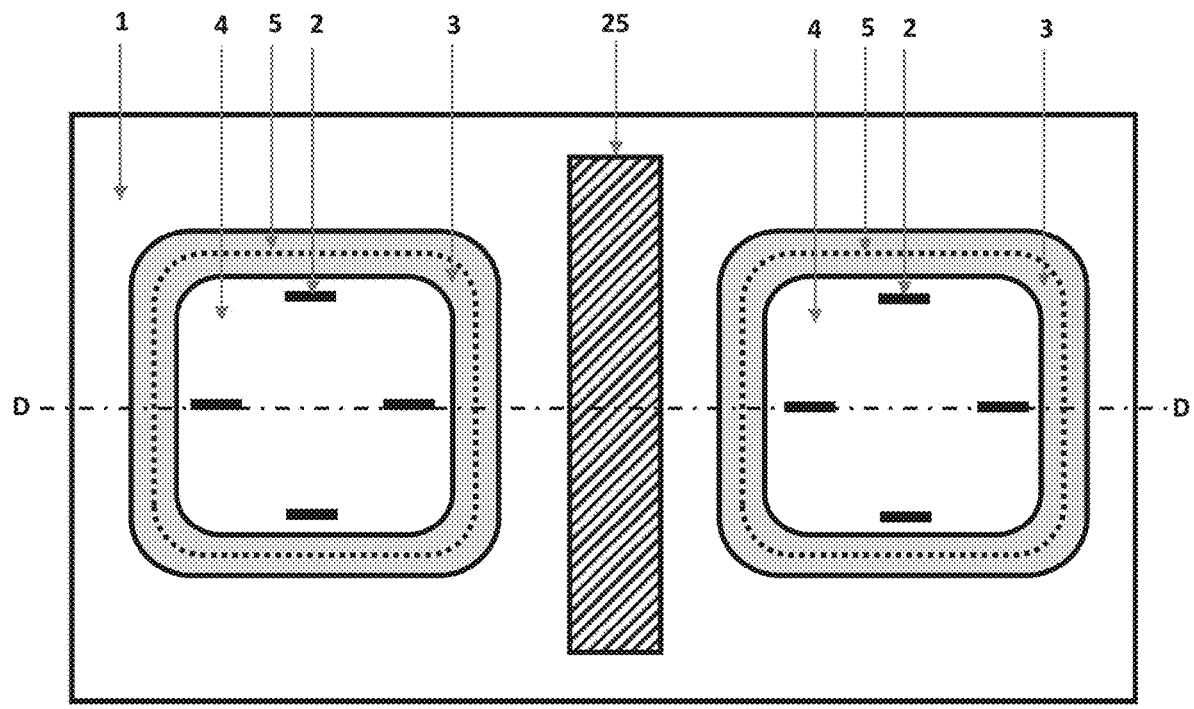
FIG. 23 shows a top view of a sensing apparatus having a sensing device with two dielectric membranes each having a pressure sensing device, and a channel restriction element located between the two dielectric membranes according to a further embodiment of the disclosure.

FIG. 23 shows a top-view of a further embodiment of the sensor where there is a sensing device comprising a substrate 1, two dielectric membranes 4 that both comprise pressure sensing elements 2, structural ring 3 and a membrane edge 5. There is a pressure drop element situated between the two membranes 28.

Figure 24:
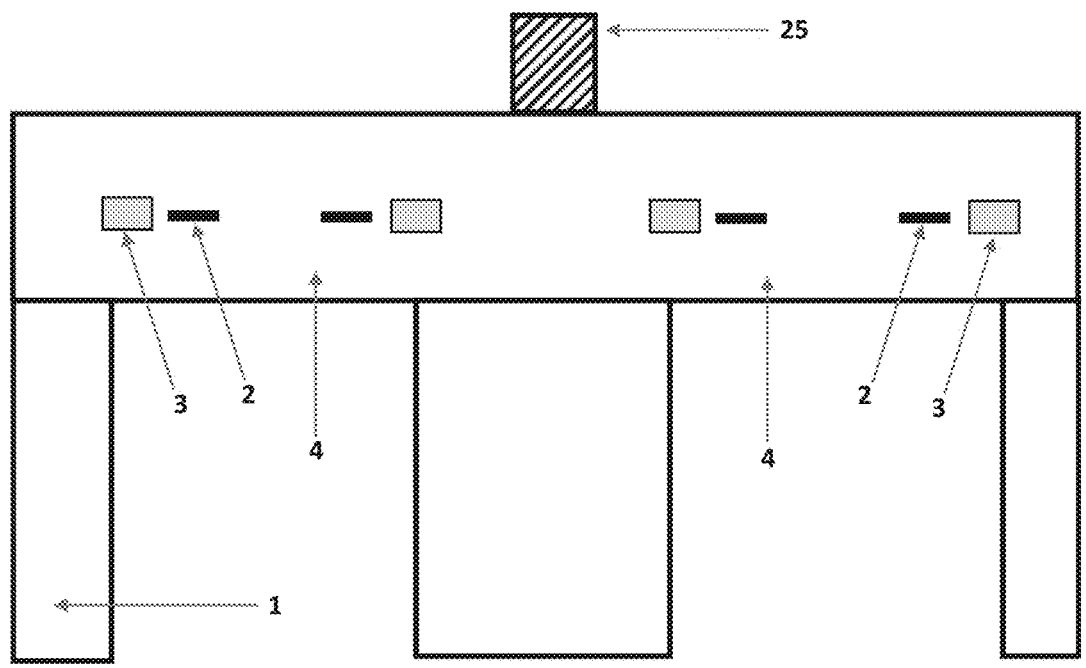
FIG. 24 shows a cross section of the sensing apparatus of FIG. 22.

FIG. 24 shows a cross-section across the line D-D of FIG. 23.

Within this embodiment, the differential pressure between the two membranes 4 may be used to directly measure the flow rate. A pressure drop element 28 has been placed on the dielectric layer between the two membranes 4 to provide an enhancement of the pressure drop and thus result in higher sensitivity for flow measurements.

Figure 25:
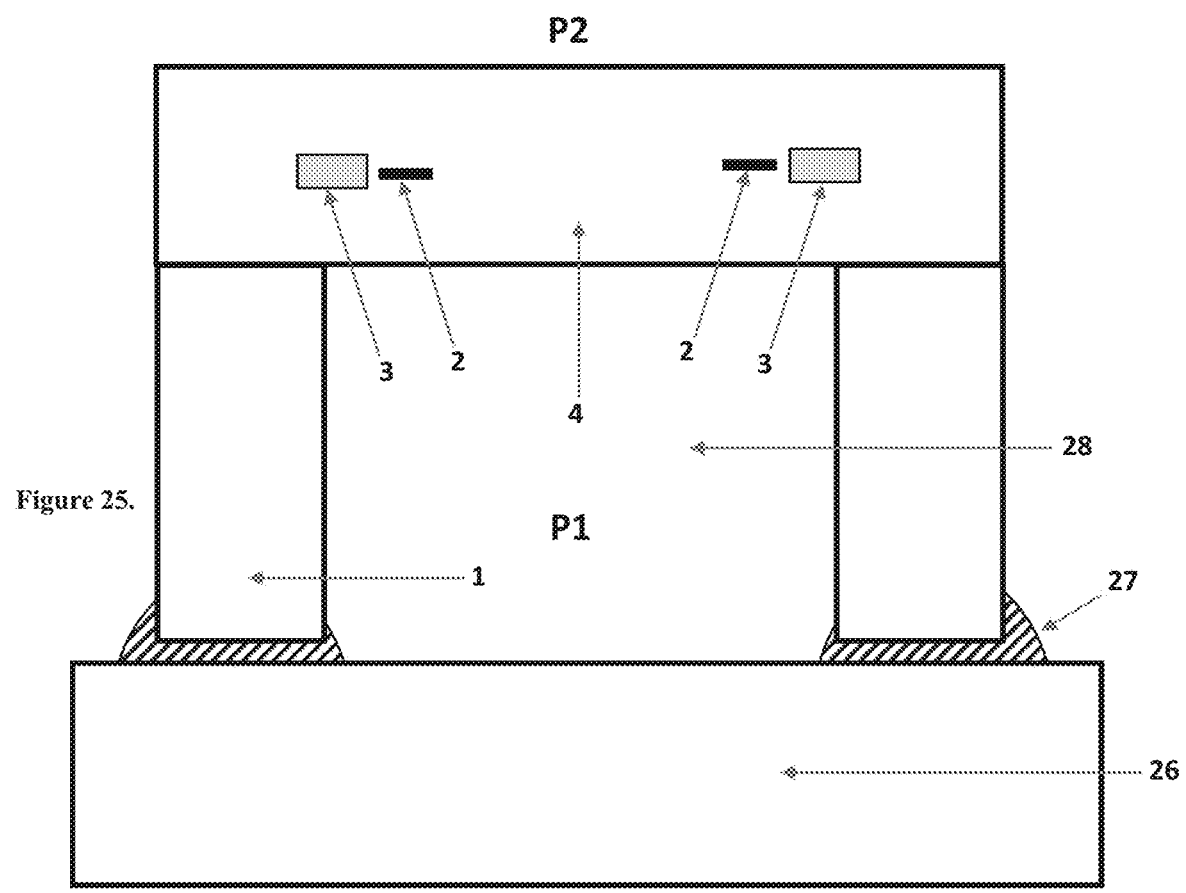
FIG. 25 shows cross section of a flow sensing apparatus where the sensing device is sealed in such a way that the etched cavity portion includes an air-tight chamber.

FIG. 25 shows a cross-section view of a further embodiment of the sensor assembly whereby there is a die comprising a substrate 1, a membrane 4 comprising pressure sensing elements 2 and a stress-engineered structure 3. The die is hermetically attached using an epoxy/glue 26 on the bottom side during packaging creating an air-tight cavity in the etched portion of the die 27.

This embodiment seals the etched portion of the die, meaning that a constant pressure of P1 is on the underside of the membrane 4. With changing ambient pressure, the pressure, P2, on the top side of the membrane 4 will become different to P1. In this way, the measurement of ambient pressure can be performed relative to the same reference point of P1; this can then be used to determine an absolute value of P2.

The skilled person will understand that in the preceding description and appended claims, positional terms such as 'above', 'overlap', 'under', 'lateral', etc. are made with reference to conceptual illustrations of an device, such as those showing standard cross-sectional perspectives and those shown in the appended drawings. These terms are used for ease of reference but are not intended to be of limiting nature. These terms are therefore to be understood as referring to a device when in an orientation as shown in the accompanying drawings.

Although the invention has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in the disclosure, whether alone or in any appropriate combination with any other feature disclosed or illustrated herein.

Many other effective alternatives will occur to the person skilled in the art. It will be understood the disclosure is not limited to the described embodiments, but encompasses all the modifications that fall within the spirit and scope of the disclosure.

The invention claimed is:

1. A flow or pressure sensing device, the sensing device comprising:
   a semiconductor substrate having a first etched portion;
   a dielectric layer located on or over the semiconductor substrate, wherein the dielectric layer comprises a first dielectric membrane located adjacent to the first etched portion of the semiconductor substrate;
   a pressure sensing element within the first dielectric membrane; and
   a first structure configured to reinforce the dielectric membrane, wherein a first portion of the first structure is located within the first dielectric membrane, wherein the first structure has a higher stiffness than the first dielectric membrane, and wherein the first portion of the first structure is located between a perimeter of the dielectric membrane and the pressure sensing element, such that the first structure defines a region of the first dielectric membrane that undergoes deformation due to flow or pressure.

2. A sensing device according to claim 1, wherein the first structure is located such that a distance from an edge of the first structure to a centre of the first dielectric membrane is at least 80% of a distance between the perimeter of the first dielectric membrane and the centre of the first dielectric membrane.

3. A sensing device according to claim 1, wherein the first structure is located completely within the first dielectric membrane.

4. A sensing device according to claim 1, wherein the first structure is located such that a second portion of the first structure configured to reinforce the dielectric membrane is located within a region of the dielectric layer outside the first dielectric membrane.

5. A sensing device according to claim 4, wherein the first structure is configured to operate as a resistor.

6. A sensing device according to claim 1, wherein the first structure comprises one or more structures extending substantially around a perimeter of the first dielectric membrane.

7. A sensing device according to claim 1, wherein the first structure comprises one or more layers comprising a CMOS material such as aluminium, polysilicon, tungsten, titanium, single crystal silicon or polysilicon.

8. A sensing device according to claim 1, further comprising a flow sensing element, wherein the pressure sensing element and the flow sensing element are both formed within the first dielectric membrane.

9. A sensing device according to claim 1, comprising a plurality of pressure sensing elements wherein each of the pressure sensing elements are located at about a midpoint of a perimeter side of the first dielectric membrane.

10. A sensing device according to claim 1, comprising a flow sensing element located completely outside the region of highest stress within the first dielectric membrane.

11. A sensing device according to claim 1, wherein the sensing device comprises one or more pressure sensing elements, and wherein the first structure comprises at least one extension portion of the first structure that extends in a direction from a perimeter of the first dielectric membrane towards a centre of the first dielectric membrane and wherein the extension portion of the first structure overlaps one of the pressure sensing elements.

12. A sensing device according to claim 11, wherein the first structure comprises at least one island portion extending from the extension portion towards a centre of the first dielectric membrane, wherein the island portion is separated from the extension portion and wherein the extension portion and the island portion both overlap one of the pressure sensing elements.

13. A sensing device according to claim 1, further comprising a membrane support structure extending across an entire width and length of the first dielectric membrane, wherein the membrane support structure comprises a layer having a grid structure.

14. A sensing device according to claim 1, wherein the sensing device comprises:
   one or more pressure sensing elements, and a heater and one or more temperature sensing elements.

15. A sensing device according to claim 1, wherein the semiconductor substrate further comprises a second etched portion, and wherein the dielectric layer further comprises a second dielectric membrane located adjacent to the second etched portion of the semiconductor substrate, and
   wherein the sensing device comprises at least one pressure sensing element within the first dielectric membrane and at least one flow sensing element within the second dielectric membrane; and
   wherein the sensing device comprises a second structure configured to reinforce the dielectric membrane located within the second dielectric membrane.

16. A sensing device according to claim 15, wherein the sensing device comprises at least two flow sensing elements within the second dielectric membrane, and wherein the flow sensing element elements are perpendicular to each other.

17. A sensing device according to claim 1, further comprising an additional pressure sensing element and/or an additional flow sensing element located within the dielectric layer and outside the dielectric membrane.

18. A sensing apparatus comprising:
   a lid;
   a sensing device according to claim 1, wherein the sensing device comprises at least two pressure sensing elements;
   and a flow sensing channel formed between a top surface of the dielectric layer and the lid, and wherein the flow sensing apparatus further comprises an channel restriction element within the flow sensing channel adjacent to a region of the dielectric layer between the at least two pressure sensing elements.

19. A sensing apparatus according to claim 18, wherein the semiconductor substrate further comprises a second etched portion, and wherein the dielectric layer further comprises a second dielectric membrane located adjacent to the second etched portion of the semiconductor substrate, and
   wherein the sensing device comprises at least one pressure sensing element within the first dielectric membrane and at least one additional pressure sensing element within the second dielectric membrane; and
   wherein the sensing device further comprises a second structure configured to reinforce the dielectric membrane located within the second dielectric membrane, and
   wherein the channel restriction element is located within the flow sensing channel adjacent to a region of the dielectric layer between the first dielectric membrane and the second dielectric membrane.

20. A sensing apparatus comprising a base and a sensing device according to claim 1, wherein the semiconductor substrate of the sensing device is attached to the base such that an air-right cavity is formed between the dielectric layer and the base by the etched portion of the semiconductor substrate.

21. A sensing device according to claim 1, wherein the first structure is configured to substantially homogenise a residual stress distribution across the first dielectric membrane.

22. A sensing device according to claim 1, wherein the first structure is configured to define a stress edge of the dielectric membrane.

23. A sensing device according to claim 1, wherein the first structure does not laterally overlap the pressure sensing element entirely.

24. A method of manufacturing a pressure or flow sensing device, the method comprising:
   forming a first dielectric membrane on a semiconductor substrate comprising an etched portion, wherein the first dielectric membrane is over an area of the etched portion of the semiconductor substrate;
   forming a pressure sensing element within the first dielectric membrane; and
   forming a first structure to reinforce the first dielectric membrane located within the first dielectric membrane, wherein the first structure has a higher stiffness than the first dielectric membrane, and wherein the first structure is located between a perimeter of the first dielectric membrane and the pressure sensing element, such that the first structure defines a region of the first dielectric membrane that undergoes deformation due to flow or pressure.

* * * * *